United States Patent
Yamashita et al.

(10) Patent No.: US 6,911,494 B2
(45) Date of Patent: Jun. 28, 2005

(54) CEMENT ADMIXTURE AND CEMENT COMPOSITION

(75) Inventors: Akihiko Yamashita, Ibaraki (JP); Hiromichi Tanaka, Toyonaka (JP); Tsuyoshi Hirata, Kobe (JP); Toru Uno, Yokohama (JP); Yoshiyuki Onda, Toshima-ku (JP)

(73) Assignee: Nippon Shokubai Co., Ltd., Osaka (JP)

(*) Notice: Subject to any disclaimer, the term of this patent is extended or adjusted under 35 U.S.C. 154(b) by 113 days.

(21) Appl. No.: 10/253,425

(22) Filed: Sep. 25, 2002

(65) Prior Publication Data

US 2003/0106464 A1 Jun. 12, 2003

(30) Foreign Application Priority Data

Sep. 28, 2001 (JP) .................................. 2001-298756

(51) Int. Cl.$^7$ .............................................. C08L 31/02
(52) U.S. Cl. ..................................... 524/556; 524/558
(58) Field of Search ........................... 524/5, 378, 377, 524/376, 556, 558

(56) References Cited

U.S. PATENT DOCUMENTS

| 5,661,206 A | | 8/1997 | Tanaka et al. |
| 5,912,284 A | * | 6/1999 | Hirata et al. ................ 524/5 |
| 6,174,980 B1 | | 1/2001 | Hirata et al. |
| 6,388,038 B1 | | 5/2002 | Hirata et al. |

FOREIGN PATENT DOCUMENTS

| EP | 0 850 894 A1 | 7/1998 |
| EP | 0 850 895 A1 | 7/1998 |
| EP | 1 103 570 A2 | 5/2001 |
| JP | 7-53249 | 2/1995 |
| JP | 10-236857 | 9/1998 |
| JP | 10-236858 | 9/1998 |
| JP | 10-236859 | 9/1998 |
| JP | 2000-7402 | 1/2000 |
| JP | 2000-7403 | 1/2000 |
| JP | 2000-233957 | 8/2000 |
| JP | 2001-48620 | 2/2001 |
| JP | 2001-220417 | 8/2001 |
| WO | WO 00/48961 | 8/2000 |

* cited by examiner

*Primary Examiner*—Robert D. Harlan
(74) *Attorney, Agent, or Firm*—Sughrue Mion, PLLC

(57) ABSTRACT

It is an object of the present invention to provide a cement admixture which can show not only a high dispersing ability and a slump loss preventing effect but also a viscosity reducing effect and can show these characteristics even in the high water reduction ratio range, and a cement composition in which this admixture is used.

A cement admixture comprising,
  as three essential constituents, a copolymer (A), an unsaturated (poly)alkylene glycol ether monomer (a) and an unpolymerizable (poly)alkylene glycol (B) not containing an alkenyl group, wherein the content of the unsaturated (poly)alkylene glycol ether monomer (a) is 1 to 100% by mass relative to the copolymer (A) and the content of the unpolymerizable (poly)alkylene glycol (B) not containing an alkenyl group is 1 to 50% by mass relative to the copolymer (A),
  the copolymer (A) comprising, as essential constituent units, a constituent unit (I) derived from the unsaturated (poly)alkylene glycol ether monomer (a) and a constituent unit (II) derived from an unsaturated carboxylic acid monomer (b), with the constituent unit (I) and constituent unit (II) each accounting for not less than 1% by mass based on all the constituent units, and
  the unsaturated carboxylic acid monomer (b) being an unsaturated monocarboxylic acid monomer.

12 Claims, No Drawings

CEMENT ADMIXTURE AND CEMENT COMPOSITION

FIELD OF THE INVENTION

The present invention relates to a cement admixture and a cement composition comprising the same.

PRIOR ART

A cement paste prepared by adding water to cement, a mortar prepared by admixing sand, which is a fine aggregate, therewith, and a concrete prepared by further admixing gravel, which is a coarse aggregate, therewith are used in large amounts in various structural materials and the like.

Nowadays, the concrete industry is incessantly demanded that the durability and strength of concrete buildings be improved. For achieving this, it is an important problem to reduce the water content per unit volume of concrete. In mortar or concrete, however, the hydration reaction between cement and water proceeds and causes hardening with the lapse of time, hence, generally, the phenomenon of slump loss, namely the decrease in flowability with the lapse of time after addition of water, cannot be avoided. For securing the dispersing ability of cement, various cement dispersants have been developed.

Among the various cement dispersants, polycarboxylic acid type cement dispersants, in particular, are advantageous in that they show higher levels of dispersing ability as compared with naphthalene type and other cement dispersants. As such cement dispersants, there have been proposed cement dispersants comprising a copolymer derived by using a specific unsaturated polyalkylene glycol ether monomer and a maleic acid monomer in a specific ratio (cf. e.g. Japanese Kokai Publication Hei-10-236858, Japanese Kokai Publication 2000-7402, and Japanese Kokai Publication 2000-7403).

Further, disclosed as additives comprising a polycarboxylic acid copolymer and another ingredient or other ingredients are a cement additive composition comprising (A) a copolymer whose essential monomer units are (a) a polyoxyalkylene derivative unit having a specific structure and (b) a unit selected from among maleic anhydride, maleic acid, maleates and maleic acid esters and which has a specific ratio between (a) and (b) and a specific weight average molecular weight and (B) a polyoxyalkylene derivative having a specific structure, with the proportions thereof being within respective specific ranges (cf. Japanese Kokai Publication 2001-48620) and a cement additive comprising a polycarboxylic acid copolymer and/or a salt thereof and a polyalkylene glycol derivative and characterized in that it contains one or more copolymers whose monomer components are at least an unsaturated polyalkylene glycol ether monomer (A) and an unsaturated mono- or dicarboxylic acid monomer (B) (cf. e.g. Japanese Kokai Publication 2000-233957).

However, such polycarboxylic acid type cement dispersants can solve the slump loss problem only to an unsatisfactory extent and rather cause such a problems as a decrease in the workability of concrete compositions in a high water reducing ratio range necessary for high strength concrete. Thus, in the existing circumstances, in the high water reduction ratio range, the flowability of concrete decreases and, in particular, the viscosity under high shear conditions becomes high, markedly increasing the pump load at the time of concrete pumping under pressure and thus producing an evil effect on concrete pumping under pressure. Therefore, there is room for contrivance for developing a cement dispersant which can show not only a high dispersing ability and a high slump loss preventing effect even in a high water reduction ratio range but also a viscosity reducing effect.

Furthermore, a cement dispersant which comprises a polycarboxylic acid comprising a polyalkylene glycol monomer unit having a polyalkylene glycol side chain, and a carboxylic acid monomer unit has been proposed (cf. e.g. Japanese Kokai Publication Hei-10-236859), wherein the polyalkylene glycol monomer giving the polyalkylene glycol monomer unit has no molecular weight distribution peak on the higher molecular weight side relative to the main peak or, if it has a peak or peaks on the higher molecular weight side, the peak area thereof is within a specific range, and a cement admixture which comprises, as an essential component, a copolymer for use in cement admixtures comprising an unsaturated polyalkylene glycol ether monomer-derived constituent unit and an unsaturated monocarboxylic acid-derived constituent unit as essential constituent units has been disclosed (cf. e.g. Japanese Kokai Publication 2001-220417), wherein the unsaturated polyalkylene glycol ether monomer is a compound having a specific alkenyl group and an oxyalkylene group(s). Even in these technologies, however, there is still room for contrivance for improving the viscosity reducing effect and other performance characteristics to improve the workability of cement compositions and further improve the durability and strength of curing products.

SUMMARY OF THE INVENTION

In view of the above-mentioned state of the art, it is an object of the present invention to provide a cement admixture which can show not only a high dispersing ability and a slump loss preventing effect but also a viscosity reducing effect and can show these characteristics even in the high water reduction ratio range, and a cement composition in which this admixture is used.

As a result of intensive investigations made by the present inventors, it was found that a mixture comprising, as essential constituents, three components, namely a specific, (poly) oxyalkylene group- and carboxyl group-containing copolymer (A) obtained by copolymerization of a specific unsaturated (poly)alkylene glycol ether monomer (a) and an unsaturated carboxylic acid monomer (b), a specific unsaturated (poly)alkylene glycol ether monomer (a) and an unpolymerizable (poly)alkylene glycol (B) not containing an alkenyl group is useful as a cement admixture. It was also found that (1) when an unsaturated monocarboxylic acid monomer is specifically selected as the unsaturated carboxylic acid monomer (b) and the proportions of the three components are specified, or (2) when the unsaturated monomer (b) further comprises a monomer other than the unsaturated monocarboxylic acid monomer and the proportions of the three components are specified in a manner different from the above mode (1), the resulting mixture can serve as a cement admixture capable of showing a high dispersing ability, a high slump loss preventing effect and, further, a viscosity reducing effect and in addition, showing these characteristics even in a high water reduction ratio range, owing to the constitution comprising these three components and the proportions thereof. It was further found that when an unsaturated monocarboxylic acid monomer is used as the unsaturated carboxylic acid monomer (b) in the production of copolymer (A), the copolymer (A) can be produced with good efficiency. Still further, it was found that when the copolymer-constituting unsaturated carboxylic acid monomer has a specific structure and/or when part of the constituent units of the copolymer is replaced with the constituent unit derived from a specific (poly)alkylene glycol mono(meth)acrylic acid ester monomer, such effects can be produced to the fullest extent. The present invention has now been completed based on these findings.

Thus, The present invention includes the following (1) to (3) aspects:

(1) A cement admixture comprising, as three essential constituents, a copolymer (A), an unsaturated (poly)alkylene glycol ether monomer (a) and an unpolymerizable (poly)alkylene glycol (B) not containing an alkenyl group, wherein the content of the unsaturated (poly)alkylene glycol ether monomer (a) is 1 to 100% by mass relative to the copolymer (A) and the content of the unpolymerizable (poly)alkylene glycol (B) not containing an alkenyl group is 1 to 50% by mass relative to the copolymer (A), the copolymer (A) comprising, as essential constituent units, a constituent unit (I) derived from the unsaturated (poly)alkylene glycol ether monomer (a) and a constituent unit (II) derived from an unsaturated carboxylic acid monomer (b), with the constituent unit (I) and constituent unit (II) each accounting for not less than 1% by mass based on all the constituent units, the unsaturated (poly)alkylene glycol ether monomer (a) being represented by the general formula (1):

YO(R¹O)nR²    (1)

wherein Y represents an alkenyl group containing 5 to 8 carbon atoms, the n R¹O groups may be the same or different and each represents an oxyalkylene group containing 2 to 18 carbon atoms, R² represents a hydrogen atom or a hydrocarbon group containing 1 to 30 carbon atoms, and n is the mean addition number of moles of the oxyalkylene group and represents a number of 1 to 500, and the unsaturated carboxylic acid monomer (b) being an unsaturated monocarboxylic acid monomer.

(2) A cement admixture comprising, as three essential constituents, a copolymer (A), an unsaturated (poly)alkylene glycol ether monomer (a) and an unpolymerizable (poly)alkylene glycol (B) not containing an alkenyl group, wherein the content of the unsaturated (poly)alkylene glycol ether monomer (a) is 1 to 50% by mass relative to the copolymer (A) and the content of the unpolymerizable (poly)alkylene glycol (B) not containing an alkenyl group is 6 to 50% by mass relative to the copolymer (A), the copolymer (A) comprising, as essential constituent units, a constituent unit (I) derived from the unsaturated (poly)alkylene glycol ether monomer (a) and a constituent unit (II) derived from an unsaturated carboxylic acid monomer (b), with the constituent unit (I) and constituent unit (II) each accounting for not less than 1% by mass based on all the constituent units, and the unsaturated (poly)alkylene glycol ether monomer (a) being represented by the general formula (1):

YO(R¹O)nR²    (1)

wherein Y represents an alkenyl group containing 5 to 8 carbon atoms, the n R¹O groups may be the same or different and each represents an oxyalkylene group containing 2 to 18 carbon atoms, R² represents a hydrogen atom or a hydrocarbon group containing 1 to 30 carbon atoms, and n is the mean addition number of moles of the oxyalkylene group and represents a number of 1 to 500.

(3) A cement composition which comprises the cement admixture according to (1) or (2), cement and water as essential constituents.

In the following, the present invention is described in detail.

DETAILED DESCRIPTION OF THE PREFERRED EMBODIMENTS

The cement admixture of the present invention comprises, as three essential constituents, a copolymer (A), an unsaturated (poly)alkylene glycol ether monomer (a) (hereinafter referred to also as "monomer (a)") and an unpolymerizable (poly)alkylene glycol (B) not containing an alkenyl group, (1) wherein the content of the unsaturated (poly)alkylene glycol ether monomer (a) is 1 to 100% by mass relative to the copolymer (A) and the content of the unpolymerizable (poly)alkylene glycol (B) not containing an alkenyl group is 1 to 50% by mass relative to the copolymer (A), or (2) wherein the content of the unsaturated (poly)alkylene glycol ether monomer (a) is 1 to 50% by mass relative to the copolymer (A) and the content of the unpolymerizable (poly)alkylene glycol (B) not containing an alkenyl group is 6 to 50% by mass relative to the copolymer (A). In the practice of the present invention, the copolymer (A), monomer (a) and nonpolymerizable (poly)alkylene glycol (B) not containing an alkenyl group may each comprise one single species or a combination of two or even three, four or more species. In the above constitutions (1) and (2), the copolymer (A) has the constituent unit (I) derived from an unsaturated (poly)alkylene glycol ether monomer (a) represented by the general formula (1) and the constituent unit (II) derived from an unsaturated carboxylic acid monomer (b) as essential constituent units, and these constituent units (I) and (II) may each comprise one single species or tow or more species. In the cement admixture having the above constitution (1), an unsaturated monocarboxylic acid monomer is used as the unsaturated carboxylic acid monomer (b).

In either of the above-mentioned constitutions (1) or (2), the cement admixture of the present invention can serve as a cement admixture capable of producing a high dispersing ability and slump loss preventing effect and, further, a viscosity reducing effect owing to the synergy of the above three components and, in addition capable of producing these characteristics even in a high water reduction ratio range and, at the same time, excellent in workability.

In a preferred form thereof, the copolymer (A) further has a constituent unit (III) derived from a (poly)alkylene glycol mono(meth)acrylic acid ester monomer (c) represented by the general formula (3):

(3)

wherein R⁶ and R⁷ are the same or different and each represents a hydrogen atom or a methyl group, the m R⁸O groups may be the same or different and each represents an oxyalkylene group containing 2 to 18 carbon atoms, m is the mean addition number of moles of the oxyalkylene group and represents a number of 1 to 500 and $R^9$ represents a hydrogen atom or a hydrocarbon group containing 1 to 30 carbon atoms. Further, the copolymer (A) may have a monomer (d)-derived constituent unit (IV) to be mentioned later herein. In the copolymer (A), these constituent units may each comprise one single species or two or more species.

In the above copolymer (A), the constituent unit (I) and constituent unit (II) each accounts for not less than 1% by mass based on all the constituent units. Further, the proportion of the constituent unit (I) in the copolymer (A) is preferably not more than 50 mole % relative to all the constituent units. When the proportion of the above constituent unit (I) is less than 1% by mass, the proportion of the unsaturated (poly)alkylene glycol ether monomer (a)-derived oxyalkylene group occurring in the copolymer (A) is too slight and, when the proportion of the above constituent unit (II) is less than 1% by mass, the proportion of the unsaturated carboxylic acid monomer (b)-derived carboxyl group occurring in the copolymer (A) is far from sufficient. In either case, a sufficient dispersing ability cannot be displayed. On the other hand, the proportion of the constituent unit (I) is preferably not more than 50 mole % based on all the constituent units for obtaining a copolymer (A) with a high dispersing ability in high yields, since the unsaturated (poly)alkylene glycol ether monomer (a) is low in polymerizability. The proportion of the constituent unit (I) is preferably not less than 5% by mass, more preferably not less than 10% by mass, still more preferably not less than 20% by mass, most preferably not less than 40% by mass. The total content (% by mass) of the constituent unit (I) and constituent unit (II) in the copolymer (A) is preferably 50 to 100% by mass, more preferably 70 to 100% by mass, based on the copolymer (A) as a whole.

The content of the constituent (III) derived from a (poly) alkylene glycol mono(meth)acrylic acid ester monomer (c) represented by the above general formula (3) in the copolymer (A) is preferably not less than 1% by mass based on all the constituent units. A cement admixture in which the copolymer (A) thus further has a constituent unit (III) derived from a (poly)alkylene glycol mono(meth)acrylic acid ester monomer (c) represented by the general formula (3) and the constituent unit (III) accounts for not less than 1% by mass based on all the constituent units constitutes one of the preferred embodiments of the present invention. The proportion of the constituent unit (III) in the copolymer (A) is preferably not more than 50% by mass, more preferably not less than 5% by mass but not more than 30% by mass, relative to 100% by mass of the copolymer (A).

In the above copolymer (A), it is preferred that the number of milliequivalents (meq/g) of carboxyl group contained in each gram of copolymer (A) as determined on the unneutralized basis be 0.2 to 5.0 meq/g. It is thus preferred that the proportion of each constituent unit constituting the copolymer (A) be selected so that the number of milliequivalents of carboxyl group in the copolymer (A) amount to a value within the above range. When the number of milliequivalents of the carboxyl group exceeds 5.0 meq/g, the slump retaining ability possibly tends to decrease and, when, conversely, it is less than 0.2 meq/g, the initial dispersing ability possibly tends to decrease. The number of milliequivalents (meq/g) of the carboxyl group is more preferably not less than 0.3, still more preferably not less than 0.4 but more preferably not more than 4.5, still more preferably not more than 4.0, particularly preferably not more than 3.5, most preferably not more than 3.0. Thus, the number of milliequivalents (meq/g) of carboxyl group is more preferably 0.3 to 4.5 meq/g, still more preferably 0.3 to 4.0 meq/g, in particular 0.4 to 3.5 meq/g, most preferably 0.4 to 3.0 meq/g. The upper limit to the content of constituent unit (II) can be selected so that the number of milliequivalents of carboxyl group contained in the copolymer (A) as determined on the unneutralized basis may be within the above range.

The copolymer (A) may have another carboxyl group-containing constituent unit in addition to the carboxyl group-containing constituent unit (II) derived from the unsaturated carboxylic acid monomer (b), so that the above-mentioned number of milliequivalents of the carboxyl group in the copolymer (A) is not always limited to the one due to the carboxyl group in the constituent unit (II).

The term "number of milliequivalents (meq/g) of carboxyl group contained in each gram of copolymer (A) as determined on the unneutralized basis" is used herein to include the case where the copolymer (A) is in a salt form. The methods of calculation are shown below for the case where it occurs as an acid and for the case where it occurs as a salt. While, in the following calculations, the constituent unit (II)-derived carboxyl groups alone are exemplified, another carboxyl group-containing constituent unit, if contained in the copolymer, this must be taken into consideration in calculating the number of milliequivalents of carboxyl group.

CALCULATION EXAMPLE 1

When the monomer (b) is acrylic acid, which has a molecular weight of 72, and the composition ratio of copolymer is monomer (a)/monomer (b)=90/10 (% by mass), the number of milliequivalents of carboxyl group per gram of the polymer as calculated regarding the monomer (b)-derived carboxyl group as determined on the unneutralized basis is $(0.1/72) \times 1{,}000 = 1.39$ (meq/g).

CALCULATION EXAMPLE 2

When the monomer (b) is maleic acid, which has a molecular weight of 116 and is a dibasic acid having two carboxyl groups per molecule, and the composition ratio of copolymer is monomer (a)/monomer (b)=90/10 (% by mass), the number of milliequivalents of carboxyl group per gram of the polymer as calculated regarding the monomer (b)-derived carboxyl groups as determined on the unneutralized basis is $0.1/(0.9+0.1)/(116/2) \times 1000 = 1.72$ (meq/g).

CALCULATION EXAMPLE 3

When the monomer (b) is disodium maleate, which has a molecular weight of 160, and the composition ratio of copolymer is monomer (a)/monomer (b)=90/10 (% by mass), the number of milliequivalents of carboxyl group per gram of the polymer as calculated regarding the monomer (b)-derived carboxyl groups as determined on the unneutralized basis is $(0.1 \times 116/160)/(0.9+0.1 \times 116/160)/(116/2) \times 1000 = 1.29$ (meq/g), since maleic acid has a molecular weight of 116 and is a dibasic acid having two carboxyl groups per molecule. When maleic acid is used in the step of polymerization and the maleic acid-derived carboxyl groups are completely neutralized with sodium hydroxide after polymerization, the result is the same as in this calculation example.

In addition to the monomer-based method of calculating the number of milliequivalents (meq/g) of carboxyl group as mentioned above, the number can also be calculated by measuring the acid value of the above copolymer (A) while taking into consideration the counter ion species relative to the carboxyl groups in the copolymer (A).

The copolymer (A) according to the present invention can be produced, for example, by copolymerizing a monomer component containing, as essential components, an unsaturated (poly)alkylene glycol ether monomer (a) giving the constituent unit (I) and an unsaturated carboxylic acid monomer (b) giving the constituent unit (II). The production method is not limited to this, however. The copolymer (A) according to the present invention can also be produced by using, in lieu of the monomer (a), a monomer prior to alkylene oxide addition, namely an unsaturated alcohol, such as 3-methyl-3-buten-1-ol, 3-methyl-2-buten-1-ol or 2-methyl-2-buten-1-ol, copolymerizing the same with a monomer (b) in the presence of a polymerization initiator, and adding 1 to 500 moles, on an average, of an alkylene oxide to the resulting copolymer. In copolymerizing those monomer components, another monomer or other monomers copolymerizable with those monomers may further be subjected to copolymerization therewith.

The unsaturated (poly)alkylene glycol ether monomer (a) to be used according to the present invention is represented by the above general formula (1).

Referring to the general formula (1) given hereinabove, the number of carbon atoms in the oxyalkylene group $R^1O$ is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition may be of the random, block and/or alternating type, for instance. For securing a balance between the hydrophilicity and hydrophobicity, it is preferred that the oxyalkylene group comprises the oxyethylene group as an essential constituent, with the oxyethylene group preferably accounting for at least 50 mole %, more preferably at least 90 mole %.

In the above general formula (1), the mean addition number of moles n of oxyalkylene group(s) is appropriately 1 to 500. When the mean addition number of moles decreases, the hydrophilicity of the polymer obtained tends to decrease, hence the dispersing ability tends to decrease. When they exceed 500, the copolymerizability tends to decrease. Preferably, it is not less than 2, more preferably not less than 5, still more preferably not less than 10, in particular not less than 15, most preferably not less than 20. Preferably, it is not more than 300. The preferred range may be, for example, 2 to 500, 5 to 500, 10 to 500, 15 to 500, or 20 to 300. The mean addition number of moles so referred to herein means the average for the number of moles of the organic group in question as added per mole of the monomer.

In the above general formula (1), $R^2$ may be either a hydrogen atom or a hydrocarbon group containing 1 to 30 carbon atoms. The hydrocarbon group containing 1 to 30 carbon atoms is preferably an alkyl group (aliphatic alkyl group or alicyclic alkyl group) containing 1 to 30 carbon atoms or a benzene ring-containing aromatic group containing 6 to 30 carbon atoms such as a phenyl group, an alkylphenyl group, a phenylalkyl group, an (alkyl)phenyl-substituted phenyl group or a naphthyl group. Since the hydrophobicity of $R^2$ increases with the increasing number of carbon atoms in the hydrocarbon group, and thereby the dispersing ability decreases. Therefore, the number of carbon atoms in $R^2$ when this is a hydrocarbon group is preferably 1 to 22, more preferably 1 to 18, still more preferably 1 to 12, in particular 1 to 4. The case where $R^2$ is a hydrogen atom is most preferred.

In the above general formula (1), the number of carbon atoms in the alkenyl group represented by Y is appropriately 5 to 8, preferably the alkenyl group containing 5 carbon atoms from the viewpoint of copolymerizability to the unsaturated carboxylic acid monomer. Further, in the general formula (1), Y is preferably a group represented by the general formula (4):

(4)

wherein $R^{10}$, $R^{11}$ and $R^{12}$ are the same or different and each represents a hydrogen atom or a methyl group, excluding the case of $R^{10}$, $R^{11}$ and $R^{12}$ each being a methyl group; $R^{13}$ is bonded to —O—$(R^1O)nR^2$ in the above general formula (1) and represents —$CH_2$—, —$(CH_2)_2$— or —$C(CH_3)_2$—; and the total number of carbon atoms in $R^{10}$, $R^{11}$, $R^{12}$ and $R^{13}$ is 3. Suitable as such alkenyl group are 3-methyl-3-butenyl, 3-methyl-2-butenyl, 2-methyl-3-butenyl, 2-methyl-2-butenyl and 1,1-dimethyl-2-propenyl. Among them, 3-methyl-3-butenyl is preferred.

The unsaturated (poly)alkylene glycol ether monomer (a) represented by the above general formula (1) can be produced, for example, by adding 1 to 500 moles of an alkylene oxide to an unsaturated alcohol such as 3-methyl-3-buten-1-ol, 3-methyl-2-buten-1-ol or 2-methyl-2-buten-1-ol. Suited for use as such monomer (a) are (poly)ethylene glycol 3-methyl-3-butenyl ether, (poly)ethylene(poly) propylene glycol 3-methyl-3-butenyl ether, (poly)ethylene (poly)butylene glycol 3-methyl-3-butenyl ether. In the practice of the present invention, one or more of these monomers can be used as monomer(s) (a) for providing the constituent unit (I).

The unsaturated (poly)alkylene glycol ether monomer (a) represented by the general formula (1) may comprise a combination of two or more species differing in the mean addition number n of moles of an oxyalkylene group. Appropriate are the combination of two monomer (a) species differing in n by not less than 5 (preferably differing in n by 10 or more, more preferably differing in n by 20 or more), and the combination of three or more monomer (a) species differing one from another in the mean addition number n of moles by not less than 5 (preferably differing in n by 10 or more, more preferably differing in n by 20 or more). As for the ranges of n to be combined, the combination of a monomer (a) in which the mean addition number n of moles is 1 to 10 and a monomer (a) in which n is 11 to 500 (with the difference in n being not less than 10, preferably not less than 20), and the combination of a monomer (a) in which the mean addition number n of moles is 1 to 40 and a monomer (a) in which n is 40 to 500 (with the difference in n being not less than 10, preferably not less than 20) are appropriate. In cases where two monomers differing in mean addition number n of moles are used in combination, the monomer (a) higher in mean addition number n of moles added is preferably used in a large proportion (ratio by mass) as compared with the monomer (a) lower in mean addition number n of moles.

The unsaturated carboxylic acid monomer (b) to be used for forming the copolymer (A) according to the present invention may comprise one single species or a combination of two or more species.

The above unsaturated carboxylic acid monomer (b) is preferably one represented by the general formula (2):

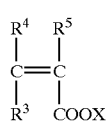

(2)

wherein $R^3$, $R^4$ and $R^5$ are the same or different and each represents a hydrogen atom, a methyl group or a group of the formula —$(CH_2)pCOOX$, and, when the unsaturated carboxylic acid monomer (b) is an unsaturated monocarboxylic acid monomer, $R^3$, $R^4$ and $R^5$ are the same or different and each represents a hydrogen atom or a methyl group; the X groups may be the same or different and each represents a hydrogen atom, a univalent metal atom, a bivalent metal atom, an ammonium group or an organic amine group; p represents an integer of 0 to 2; and, when there are two COOX groups, the two —COOX groups may form a —COOCO— group. When, in the above general formula (2), two —COOX groups form a —COOCO— group, the unsaturated carboxylic acid monomer (b) is an anhydride.

In the cement admixture having the above constitution (1), the above unsaturated carboxylic acid monomer (b) is an unsaturated monocarboxylic acid monomer. Preferred as the unsaturated monocarboxylic acid monomer are acrylic acid, methacrylic acid and crotonic acid, and metal salts, ammonium salts and amine salts of these. Among these, the use of (meth)acrylic acid and/or a salt thereof as an essential constituent is preferred, and the use of acrylic acid and/or a salt thereof as an essential constituent is more preferred.

Usable as the unsaturated carboxylic acid monomer (b) in the cement admixture having the above constitution (2) are those unsaturated monocarboxylic acid monomers mentioned above as well as unsaturated dicarboxylic acid monomers, and salts and anhydrides thereof. Suitable as the unsaturated dicarboxylic acid monomer are maleic acid, itaconic acid, citraconic acid, fumaric acid, and metal salts, ammonium salts and amine salts of these and, further, maleic anhydride, itaconic anhydride and citraconic anhydride as the anhydrides thereof. Among these, one or more monomers selected from the group consisting of (meth)acrylic acid and salts thereof, maleic acid and salts thereof, and maleic anhydride are preferably used as essential constituents. The use of one or more monomers selected from the group consisting of acrylic acid and salts thereof, maleic acid and salts thereof, and maleic anhydride as essential constituents is more preferred.

In the production of above mentioned copolymer (A), when the (poly)alkylene glycol mono(meth)acrylic acid ester monomer (c), which provides the constituent unit (III), is used, the number of carbon atoms contained in the oxyalkylene group $R^8O$ in the above general formula (3) is appropriately 2 to 18 but preferably 2 to 8, more preferably 2 to 4. In the case of adducts of two or more alkylene oxides arbitrarily selected from among ethylene oxide, propylene oxide, butylene oxide, styrene oxide and the like, the mode of addition may be any of the random, block, alternating or other addition types. In the above general formula (3), the mean addition number m of moles of an oxyalkylene group (s) is appropriately 1 to 500, preferably not less than 2 but not more than 300, more preferably not more than 200, still more preferably not more than 100, most preferably not more than 50. A preferred range is 2 to 500, 2 to 300, 2 to 100, or 2 to 50, for instance. As this mean addition number of moles increases, the copolymerizability with the unsaturated (poly)alkylene glycol ether monomer (a) which provides the constituent unit (I) tends to decrease. Furthermore, in the above general formula (3), $R^9$ may be a hydrogen atom or a hydrocarbon group containing 1 to 30 carbon atoms. Appropriate as the hydrocarbon group containing 1 to 30 carbon atoms are those specifically mentioned hereinabove referring to $R^2$. Since, however, the hydrophobicity increases and the dispersing ability decreases as the increase in the number of carbon atoms in the hydrocarbon group, the number of carbon atoms in the hydrocarbon group represented by $R^9$ is preferably 1 to 22, more preferably 1 to 18, still more preferably 1 to 12, in particular 1 to 5.

Suited for use as the (poly)alkylene glycol mono(meth) acrylic acid ester monomer (c) are shown in the following: hydroxyalkyl (meth)acrylates (corresponding to the case where, in the above general formula (3), m is 1 and $R^9$ is a hydrogen atom) such as hydroxyethyl (meth)acrylate, hydroxypropyl (meth)acrylate and hydroxybutyl (meth) acrylate; various polyalkylene glycol mono(meth)acrylates (corresponding to the case where, in the above general formula (3), m is not less than 2 and $R^9$ is a hydrogen atom) such as polyethylene glycol mono(meth)acrylate, polypropylene glycol mono(meth)acrylate and polybutylene glycol mono(meth)acrylate; various alkoxy(poly)alkylene glycol mono(meth)acrylates (corresponding to the case where, in the above general formula (3), $R^9$ is a hydrocarbon group containing 1 to 30 carbon atoms) such as methoxy(poly) ethylene glycol mono(meth)acrylate and methoxy(poly) ethylene(poly)propylene glycol mono(meth)acrylate; and the like.

When the (poly)alkylene glycol mono(meth)acrylic acid ester monomer (c) is used, the copolymer (A), in particular, preferably comprises a (poly)alkylene glycol monoacrylic acid ester monomer-derived constituent unit as an essential constituent unit. Suitable as the monomer which provides such constituent unit are hydroxyalkyl acrylates (corresponding to the case where, in the above general formula (3), m is 1 and $R^6$, $R^7$ and $R^9$ each is a hydrogen atom) such as 2-hydroxyethyl acrylate, 2-hydroxypropyl acrylate and 2-hydroxybutyl acrylate; various polyalkylene glycol monoacrylates (corresponding to the case where, in the above general formula (3), m is not less than 2 and $R^6$, $R^7$ and $R^9$ each is a hydrogen atom) such as polyethylene glycol monoacrylate, polypropylene glycol monoacrylate and polybutylene glycol monoacrylate; and various alkoxy (poly)alkylene glycol monoacrylates (corresponding to the case where, in the above general formula (3), $R^6$ and $R^7$ each is a hydrogen atom and $R^9$ is a hydrocarbon group containing 1 to 30 carbon atoms) such as methoxy(poly)ethylene glycol monoacrylate and methoxy(poly)ethylene(poly) propylene glycol monoacrylate.

In preparing the above copolymer (A), another copolymerizable monomer (d) may be used in addition to the monomer components giving the respective essential constituent units. Such monomer (d) forms a constituent unit (IV). The constituent unit (IV)—forming monomer (d) is a monomer copolymerizable with the monomer (a), monomer (b) and monomer (c), and includes one or more of the following: half esters and diesters derived from unsaturated dicarboxylic acid monomers, such as maleic acid, maleic anhydride, fumaric acid, itaconic acid and citraconic acid, and alcohols containing 1 to 30 carbon atoms; half amides and diamides derived from the above-mentioned unsaturated dicarboxylic acid monomers and amines containing 1 to 30 carbon atoms; half esters and diesters derived from the above-mentioned unsaturated dicarboxylic acid monomers and alkyl(poly)alkylene glycols, which are adducts of 1 to 500 moles of an alkylene oxide(s) containing 2 to 18 carbon atoms with the above-mentioned alcohols or amines; half esters and diesters derived from the above-mentioned unsaturated dicarboxylic acid monomers and glycols containing 2 to 18 carbon atoms or polyalkylene glycols, which are adducts of 2 to 500 moles of an alkylene oxide(s) with such glycols; esters of unsaturated monocarboxylic acids with an alcohol containing 1 to 30 carbon atoms, such as methyl (meth)acrylate, ethyl (meth)acrylate, propyl (meth)acrylate, glycidyl (meth)acrylate, methyl crotonate, ethyl crotonate, and propyl crotonate; half amides derived from maleinamic acid and glycols containing 2 to 18 carbon atoms or polyalkylene glycols, which are adducts of 2 to 500 moles of an alkylene oxide(s) with such glycols; (poly)alkylene glycol di(meth)acrylates such as triethylene glycol di(meth)acrylate, (poly)ethylene glycol di(meth)acrylate, (poly)propylene glycol di(meth)acrylate and (poly)ethylene glycol-(poly)propylene glycol di(meth)acrylate; multifunctional (meth)acrylates such as hexanediol di(meth)acrylate, trimethylolpropane tri(meth)acrylate and trimethylolpropane di(meth)acrylate; (poly)alkylene glycol dimaleates such as triethylene glycol dimaleate and polyethylene glycol dimaleate; unsaturated sulfonic acids and monovalent metal salts, divalent metal salts, ammonium salts and organic amine salts thereof, for example vinylsulfonates, (meth)allylsulfonates, 2-(meth)acryloxyethylsulfonates, 3-(meth)acryloxypropylsulfonates, 3-(meth)acryloxy-2-hydroxypropylsulfonates, 3-(meth)acryloxy-2-hydroxypropyl sulfophenyl ether, 3-(meth)acryloxy-2-hydroxypropyloxysulfobenzoates, 4-(meth)acryloxybutylsufonates, (meth)acrylamidomethylsulfonates, (meth)acrylamidoethylsulfonates, 2-methylpropanesulfonic acid (meth)acrylamide, and styrenesulfonic acid; amides derived from unsaturated monocarboxylic acids and amines containing 1 to 30 carbon atoms, for example methyl(meth)acrylamide; vinyl aromatics such as styrene, α-methylstyrene, vinyltoluene and p-methylstyrene; alkanediol mono(meth)acrylates such as 1,4-butanediolmono(meth)acrylate, 1,5-pentanediol mono(meth)acrylate and 1,6-hexanediol mono(meth)acrylate; dienes such as butadiene, isoprene, 2-methyl-1,3-butadiene and 2-chloro-1,3-butadiene; unsaturated amides such as (meth)acrylamide, (meth)acrylalkylamides, N-methylol (meth)acrylamide and N,N-dimethyl(meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatics such as divinylbenzene; cyanurates such as triallyl cyanurate; allyl compounds such as (meth)allyl alcohol and glycidyl (meth)allyl ether; vinyl or allyl ethers such as methoxypolyethylene glycol monovinyl ether, polyethylene glycol monovinyl ether, methoxypolyethylene glycol mono(meth)allyl ether and polyethylene glycol mono(meth)allyl ether; and siloxane derivatives such as polydimethylsiloxanepropylaminomaleinamic acid, polydimethylsiloxaneaminopropyleneaminomaleinamic acid, polydimethylsiloxane-bis(propylaminomaleinamic acid), polydimethylsiloxane-bis(dipropyleneaminomaleinamic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate).

The proportion of the monomer (d)-derived constituent unit (IV) in the above copolymer (A) may be within such a range as will not lessen the effects of the present invention. Preferably, it is 0 to 50% by mass, more preferably 0 to 30% by mass, on the whole copolymer (A) basis.

For obtaining the copolymer (A) according to the present invention, a monomer component comprising the above monomers is subjected to copolymerization using a polymerization initiator. In the practice of the present invention, the monomer species contained, and the amounts thereof, in the monomer component are to be appropriately selected so that the copolymer (A)-constituting monomer units may meet the conditions mentioned above.

The above copolymerization can be carried out in the conventional manner, for example by solution polymerization or bulk polymerization. The solution polymerization can be carried out either batchwise or continuously. Suited for use as the solvent on that occasion are water; lower alcohols such as methyl alcohol, ethyl alcohol and isopropyl alcohol; aromatic or aliphatic hydrocarbons such as benzene, toluene, xylene, cyclohexane and n-hexane; ester compounds such as ethyl acetate; and ketone compounds such as acetone and methyl ethyl ketone; cyclic ether compounds such as tetrahydrofuran and dioxane. Among these, at least one solvent selected from the group consisting of water and lower alcohols containing 1 to 4 carbon atoms is preferably used in view of the solubility of these starting monomers and of the polymer produced. The use of water, among others, is more preferred since no step is required for solvent removal.

In carrying out the polymerization in aqueous solution, use is made, as a radical polymerization initiator, a water-soluble polymerization initiator, for example, a persulfate such as ammonium persulfate, sodium persulfate or potassium persulfate; hydrogen peroxide; or a water-soluble azo initiator, for example an azoamidine compound such as 2,2'-azobis-2-methylpropionamidine hydrochloride, a cyclic azoamidine compound such as 2,2'-azobis-2-(2-imidazolin-2-yl)propane hydrochloride, or an azonitrile compound such as 2-carbamoylazoisobutyronitrile and, on that occasion, an accelerator may be used combinedly, for example an alkali metal sulfite such as sodium hydrogen sulfite, a metabisulfite, sodium hypophosphate, an Fe(II) salt such as Mohr's salt, sodium hydroxymethanesulfinate dihydrate, hydroxylamine hydrochloride, thiourea, L-ascorbic acid (salt) or erythorbic acid (salt). Among them, the combined use of hydrogen peroxide and an accelerator such as L-ascorbic acid (salt) is preferred. These radical polymerization initiators and accelerators may be used respectively singly or in combination of two or more.

In carrying out the solution polymerization using a lower alcohol, aromatic or aliphatic hydrocarbon, ester compound or ketone compound as the solvent, or in carrying out the bulk polymerization, a peroxide such as benzoyl peroxide, lauroyl peroxide or sodium peroxide; a hydroperoxide such as tert-butyl hydroperoxide or cumene hydroperoxide; or such an azo compound as azobisisobutyronitrile, for instance, is used as the polymerization initiator. On that occasion, an accelerator such as an amine compound may be used in combination. Further, when a mixed solvent composed of water and a lower alcohol is used, an appropriate polymerization initiators or polymerization initiator-accelerator combination can be selected from among the above-mentioned various initiators or initiator-accelerator combinations.

The total amount of the monomer component to be used in carrying out the above polymerization is preferably not less than 30% by mass relative to all the raw materials including other materials. When the total amount of the monomer component is far below this range, the rate of polymerization and the productivity will unfavorably decrease. More preferably, it is 40 to 99% by mass, still more preferably 50 to 99% by mass, particularly preferably 55 to 95% by mass, most preferably 60 to 90% by mass.

An injecting method of each monomer to a reaction vessel is not particularly restricted but includes a method comprising injecting the whole monomers to a reaction vessel collectively at the initial stage, a method comprising injecting the whole monomers to a reaction vessel divisionally or continuously, and a method comprising injecting part of monomers to a reaction vessel at the initial stage and then injecting the remnant to a reaction vessel divisionally or continuously. As appropriate methods of injection, there may specifically be mentioned a method comprising injecting the whole amounts of the monomer (a) and monomer (b) to a reaction vessel continuously, a method comprising injecting part of the monomer (a) to a reaction vessel at the initial stage and then injecting the remnant of the monomer (a) and the whole of the monomer (b) to the reaction vessel continuously, and a method comprising injecting part of the monomer (a) and part of the monomer (b) to a reaction vessel at the initial stage, and then injecting the remnant of the monomer (a) and the remnant of the monomer (b) to the reaction vessel in several portions, respectively by turns.

Further, by varying the injection speed of each monomer to a reaction vessel continuously or gradationally and changing the mass ratio of each injected monomer per time continuously or gradationally, a mixture of copolymers (A) differing in ratio between constituent unit (I) and constituent unit (II) in copolymer (A) may be synthesized during polymerization reaction. In addition, a radical polymerization initiator may be placed in a reaction vessel at the initial stage, or may be added dropwise to a reaction vessel, and these methods may be used combinedly according to need.

For controlling the molecular weight of the product polymer, a chain transfer agent may be used. Suitable as the chain transfer agent are conventional hydrophilic chain transfer agents, for example, thiol type chain transfer agents such as mercaptoethanol, thioglycerol, thioglycolic acid, 3-mercaptopropionic acid, thiomalic acid and 2-mercaptoethane sulfonic acid: secondary alcohol such as isopropyl alcohol; lower oxides such as phosphorous acid, hypophosphorous acid and salts thereof (for example, sodium hypophosphorate and potassium hypophosphorate), sulfurous acid, hydrogen sulfite, dithionic acid, (meth) bisulfurous acid and salts thereof(for example, sodium sulfite, sodium hydrogen sulfite, sodium dithionite and sodium (meth)bisulfite), and salts thereof. Further, the use of hydrophobic chain transfer agent is effective for improvement in cement composition viscosity. Suitable as the hydrophobic chain transfer agent are thiol type chain transfer agents having a hydrocarbon group containing 3 or more carbon atoms such as butanethiol, octanethiol, decanethiol, dodecanethiol, hexadecanethiol, octadecanethiol, cyclohexyl mercaptan, thiophenol, thioglycolic octyl, and 3-mercaptopropionic octyl. It is also possible to use two or more chain transfer agents combinedly and to use a hydrophilic chain transfer agent and hydrophobic chain transfer agent combinedly. Further, the molecular weight of the copolymer (A) can also be controlled effectively by using, as the monomer (d), a monomer highly active in chain transfer, for example (meth)allylsulfonic acid (or a salt thereof).

For obtaining the copolymer (A) with a predetermined molecular weight with good reproducibility in the above copolymerization, it is necessary that the copolymerization reaction proceed in a stable manner. Therefore, in the case of solution polymerization, the dissolved oxygen concentration in the solvent employed at 25° C. is preferably not more than 5 ppm, more preferably 0.01 to 4 ppm, still more preferably 0.01 to 2 ppm, most preferably 0.01 to 1 ppm. When the addition of the monomers to the solvent is followed by purging with nitrogen or the like, it is preferable that the dissolved oxygen concentration in the system, including the monomers, be within the above range.

The adjustment of the dissolved oxygen concentration in the above solvent may be carried out in the polymerization vessel or by using the solvent adjusted in advance with respect to the dissolved oxygen content. Suitable as the method of eliminating oxygen in solvents are the following methods (1) to (5):

(1) A closed vessel containing the solvent is charged with an inert gas, such as nitrogen, under pressure, and the pressure within the closed vessel is then reduced to thereby reduce the partial pressure of oxygen in the solvent. The pressure within the closed vessel may be reduced in a nitrogen stream.

(2) The gaseous phase in a vessel containing the solvent is replaced with an inert gas, such as nitrogen, and the liquid phase is stirred vigorously for a sufficiently long period of time.

(3) The solvent placed in a vessel is bubbled with an inert gas, such as nitrogen, for a sufficiently long period of time.

(4) The solvent is once boiled and then cooled in an inert gas (e.g. nitrogen) atmosphere.

(5) The relevant piping is provided with a static mixer, and the solvent is admixed with an inert gas, such as nitrogen, in the course of transfer to the polymerization vessel through the piping.

The copolymer (A) obtained by the above copolymerization as such may be used as an essential component in the cement admixture of the present invention. From the handleability viewpoint, it is preferred that the pH be adjusted to not lower than 5. Since, however, when the polymerization is carried out at pH 5 or above, the rate of polymerization will decrease and, at the same time, the copolymerizability will worsen and the cement-dispersing ability will lower, it is preferred that the copolymerization reaction be carried out at a pH lower than 5 and, after copolymerization, the pH be adjusted to 5 or above. The pH adjustment can be carried out using one or more of univalent or bivalent metal hydroxides and carbonates and like inorganic salts; ammonia; organic amines and other alkaline substances. After completion of the reaction, it is also possible to adjust the concentration, if necessary.

The above copolymers (A) preferably has a weight average molecular weight of 1,000 to 500,000 as determined be gel permeation chromatography (hereinafter referred to as "GPC") on the polyethylene glycol equivalent basis. By selecting such a weight average molecular weight range, it becomes possible to obtain cement admixtures capable of manifesting higher levels of dispersing ability. More preferably, the molecular weight is not less than 5,000 but not more than 300,000, still more preferably not less than 10,000 but not more than 150,000. The range of the molecular weight is more preferably 5,000 to 300,000, still more preferably 10,000 to 150,000.

In the cement admixture of the present invention, two or more copolymer (A) species may be used combinedly, and three, four or more copolymer (A) species may also be combined satisfactorily. Possible as the combination of two or more copolymer (A) species are, for example, the combination of two or more copolymer (A) species differing in the ratio (mass ratio or mole ratio) between the unsaturated (poly)alkylene glycol ether monomer (a)-derived constituent unit (I) and the unsaturated carboxylic acid monomer (b)-derived constituent unit (II), and the combination of two or more copolymer (A) species differing in the mean addition number (n) of moles of an oxyalkylene group in the unsaturated (poly)alkylene glycol ether monomer (a) represented by the above general formula (1) in the respective copolymer.

In accordance with the present invention, the cement admixture having the above constitution (1) contains the unsaturated (poly)alkylene glycol ether monomer (a) represented by the general formula (1) in an amount of 1 to 100% by mass relative to the copolymer (A). The cement admixture having the above constitution (2) contains the unsaturated (poly)alkylene glycol ether monomer (a) represented by the general formula (1) in an amount of 1 to 50% by mass relative to the copolymer (A). When the content of the above monomer (a) is below the above range, the slump loss preventing and viscosity reducing effects will be unsatisfactory. Conversely, when it exceeds the above range, the cement-dispersing ability will decrease.

In the cement admixture having the above constitution (1), the proportion of the monomer (a) to the copolymer (A) is preferably not less than 2% by mass, more preferably not less than 3% by mass, still more preferably not less than 5% by mass. On the other hand, it is preferably not more than 90% by mass, more preferably not more than 80% by mass, still more preferably not more than 60% by mass, most preferably not more than 50% by mass. An appropriate range is thus preferably 2 to 100% by mass, more preferably 3 to 90% by mass, still more preferably 5 to 80% by mass, particularly preferably 5 to 60% by mass, most preferably 5 to 50% by mass. In the cement admixture having the constitution (2), it is preferably not less than 2% by mass, more preferably not less than 3% by mass, still more preferably not less than 5% by mass. On the other hand, it is preferably not more than 45% by mass, more preferably not more than 40% by mass. As for the appropriate range, it is preferably 2 to 50% by mass, more preferably 3 to 45% by mass, still more preferably 5 to 40% by mass.

The unsaturated (poly)alkylene glycol ether monomer (a) may be the same as or different from the unsaturated (poly)alkylene glycol ether monomer (a) used in polymerizing the copolymer (A), namely the unsaturated (poly) alkylene glycol ether monomer (a) from which the constituent unit (I) in the copolymer (A) is derived. Further, it is also possible to use two or more unsaturated (poly)alkylene glycol ether monomer (a) species.

The cement admixture having the above constitution (1) contains the unpolymerizable (poly)alkylene glycol (B) not containing an alkenyl group in an amount of 1 to 50% by mass relative to the copolymer (A). The cement admixture having the above constitution (2) contains the unpolymerizable (poly)alkylene glycol (B) not containing an alkenyl group in an amount of 6 to 50% by mass relative to the copolymer (A). When the content of the unpolymerizable (poly)alkylene glycol (B) not containing an alkenyl group is below the above range, the slump loss preventing and viscosity reducing effects will be unsatisfactory. Conversely, when it exceeds the above range, the cement-dispersing ability will decrease.

In the cement admixture having the above constitution (1), the proportion of the unpolymerizable (poly)alkylene glycol (B) not containing an alkenyl group to the copolymer is preferably not less than 2% by mass, more preferably not less than 3% by mass. On the other hand, it is preferably not more than 40% by mass, more preferably not more than 30% by mass. An appropriate range is thus preferably 2 to 50% by mass, more preferably 2 to 40% by mass, still more preferably 3 to 30% by mass. In the cement admixture having the constitution (2), it is preferably not more than 40% by mass, more preferably not more than 30% by mass. As for the appropriate range, it is preferably 6 to 40% by mass, more preferably 6 to 30% by mass.

The number of carbon atoms in the oxyalkylene group in the above unpolymerizable (poly)alkylene glycol (B) not containing an alkenyl group is suitably 2 to 18, preferably 2 to 8, more preferably 2 to 4. Further, the unpolymerizable (poly)alkylene glycol (B) not containing an alkenyl group is preferably water-soluble and preferably contains that highly hydrophilic oxyalkylene group which contains 2 carbon atoms, namely the oxyethylene group, as an essential constituent, more preferably contains the oxyethylene group in a proportion of not less than 50 mole %, still more preferably not less than 90 mole %. The oxyalkylene repeating unit may comprise one single species or two or more different species and, when the oxyalkylene group is in the form of a mixture of two or more species, they may be in the block, random, or alternating addition mode, for instance. Each terminal group of the unpolymerizable (poly)alkylene glycol (B) not containing an alkenyl group may suitably be a hydrogen atom, an alkyl group containing 1 to 30 carbon atoms or an (alkyl)phenyl group but preferably is a hydrogen atom.

The above unpolymerizable (poly)alkylene glycol (B) not containing an alkenyl group preferably has a weight average molecular weight of not less than 100, more preferably not less than 500, still more preferably not less than 1,000, but preferably not more than 200,000, more preferably not more than 100,000, still more preferably not more than 50,000, on the polyethylene glycol equivalent basis as determined by GPC. An appropriate range is preferably 100 to 200,000, more preferably 500 to 100,000, still more preferably 1,000 to 50,000.

As specific examples of the unpolymerizable (poly) alkylene glycol (B) not containing an alkenyl group ending in a hydrogen atom at each end as mentioned above, there may be mentioned (poly)ethylene glycol, (poly)propylene glycol, (poly)ethylene(poly)propylene glycol and (poly) ethylene(poly)butylene glycol. Since, however, it is desirable that the unpolymerizable (poly)alkylene glycol (B) not containing an alkenyl group be soluble in water, those (poly)alkylene glycol species which contain the highly hydrophilic oxyethylene group as an essential constituent thereof are preferred and those (poly)alkylene glycol species which contain, as an essential constituent thereof, the oxyethylene group in a proportion of not less than 90 mole % are more preferred. Among them, (poly)ethylene glycol or (poly)ethylene(poly)propylene glycol is preferred, and (poly)ethylene glycol is most preferred. The unpolymerizable (poly)alkylene glycol (B) not containing an alkenyl group may comprises one single species or a combination of two or more species.

The above unpolymerizable (poly)alkylene glycol (B) not containing an alkenyl group, which is an essential constituent of the cement admixture of the present invention, may be compounded with the copolymer (A) after production thereof. It is also possible to obtain a cement admixture comprising the copolymer (A) and the unpolymerizable (poly)alkylene glycol (B) not containing an alkenyl group by carrying out, in the step of producing the copolymer (A), the copolymerization using, as a raw material composition, a monomer component comprising not only the above-mentioned unsaturated (poly)alkylene glycol ether monomer (a) and the above-mentioned unsaturated carboxylic acid monomer (b) as essential constituents but also the unpolymerizable (poly)alkylene glycol (B) not containing an alkenyl group.

The unsaturated (poly)alkylene glycol ether monomer (a) to be used in the practice of the present invention can be prepared by adding 1 to 500 moles of an alkylene oxide to an unsaturated alcohol such as 3-methyl-3-buten-1-ol, 3-methyl-2-buten-1-ol or 2-methyl-2-buten-1-ol. When, on the occasion of this addition reaction, an active hydrogen-containing compound, such as a saturated aliphatic alcohol (e.g. methanol, ethanol) other than the unsaturated alcohol, or water, is present in the reaction system, a composition comprising, as a byproduct, a (poly)alkylene glycol derived from the active hydrogen-containing compound as a starting material in addition to the main product, namely the monomer (a) is obtained.

In the practice of the present invention, the copolymerization reaction for the preparation of the copolymer (A) can be carried out using, as a raw material composition, a composition containing the main product monomer (a) and such a byproduct (poly)alkylene glycol as obtained in the production of the monomer (a), without removing the byproduct (poly)alkylene glycol. This production method makes it easy to obtain a cement admixture containing the above copolymer (A) and the unpolymerizable (poly) alkylene glycol (B) not containing an alkenyl group. The cement admixture produced by such method of production constitutes one of the preferred embodiments of the present invention.

When the (poly)alkylene glycol formed as a byproduct in the production of the monomer (a) is a (poly)alkylene glycol hydrogen-terminated at each end, namely (poly)ethylene glycol, (poly)ethylene(poly)propylene glycol or the like, namely when water having two active hydrogen atoms is the starting material, the molecular weight of the (poly)alkylene glycol is higher than the molecular weight of the monomer (a) derived from an unsaturated alcohol having only one active hydrogen atom, and the average molecular weight thereof is generally about the same to about twice that of the monomer (a).

It is also possible to further add an unpolymerizable (poly)alkylene glycol (B) not containing an alkenyl group after the production of the copolymer (A). The unpolymerizable (poly)alkylene glycol (B) not containing an alkenyl group to be added may be the same or different from the unpolymerizable (poly)alkylene glycol (B) not containing an alkenyl group contained as a byproduct in the copolymer (A).

Further, when, in producing the copolymer (A), the copolymerization reaction is carried out using, as a raw material composition, a composition comprising the above unsaturated (poly)alkylene glycol ether monomer (a), the above unsaturated carboxylic acid monomer (b) and the unpolymerizable (poly)alkylene glycol (B) not containing an alkenyl group and, further, an oxyalkylene type antifoaming agent, a cement admixture comprising the copolymer (A), the unpolymerizable (poly)alkylene glycol (B) not containing an alkenyl group and the oxyalkylene type antifoaming agent can be obtained. While the oxyalkylene type antifoaming agent, which is highly hydrophobic, has a drawback in that when compounded with the copolymer (A), it tends to undergo phase separation and thus is poor in storage stability, a cement admixture having good storage stability can be obtained when the copolymerization reaction is carried out using a raw material composition containing the oxyalkylene type antifoaming agent incorporated in advance, as mentioned above.

The above-mentioned oxyalkylene type antifoaming agent includes following compounds: polyoxyalkylene compounds such as (poly)oxyethylene(poly)oxypropylene adducts; (poly)oxyalkylene alkyl ethers such as diethylene glycol heptyl ether, polyoxyethylene oleyl ether, polyoxypropylene butyl ether, polyoxyethylenepolyoxypropylene 2-ethylhexyl ether, and higher (containing 12 to 14 carbon atoms) alcohol-oxyethyleneoxypropylene adducts; (poly)oxyalkylene (alkyl)aryl ethers such as polyoxypropylene phenyl ether and polyoxyethylene nonylphenyl ether; acetylene ethers produced by addition polymerization of an alkylene oxide onto an acetylene alcohol such as 2,4,7,9-tetramethyl-5-decyne-4,7-diol, 2,5-dimethyl-3-hexyne-2,5-diol or 3-methyl-1-butyn-3-ol; (poly)oxyalkylene fatty acid esters such as diethylene glycol oleate, diethylene glycol laurate and ethylene glycol distearate; (poly) oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as polyoxypropylene methyl ether sulfate sodium salt and polyoxyethylene dodecylphenyl ether sulfate sodium salt; (poly)oxyalkylene alkylphosphate esters such as polyoxyethylene stearylphosphate; (poly) oxyalkylenealkylamines such as polyoxypropylenepolyoxyethylenelaurylamine; polyoxyalkyleneamides, etc. Further, two or more of these oxyalkylene type antifoaming agents may also be used in combination.

In the composition with the above oxyalkylene type antifoaming agent incorporated therein, the proportion of the oxyalkylene type antifoaming agent is preferably within the range of 0.01 to 10% by mass, more preferably 0.05 to 5% by mass, relative to the total amount of the monomer component to be subjected to the copolymerization reaction.

In the composition comprising the unsaturated (poly) alkylene glycol ether monomer (a) and the unpolymerizable (poly)alkylene glycol (B) not containing an alkenyl group, which is to be used in carrying out the copolymerization reaction, the proportion of the unpolymerizable (poly) alkylene glycol (B) not containing an alkenyl group to 100% by mass of the unsaturated (poly)alkylene glycol ether monomer (a) is preferably not more than 50% by mass. When the proportion of the unpolymerizable (poly)alkylene glycol (B) not containing an alkenyl group exceeds 50% by mass, the monomer concentration in the polymerization reaction decreases, so that the molecular weight of the copolymer (A) may lower. That proportion is more preferably not more than 40% by mass, still more preferably not more than 30% by mass, most preferably not more than 20% by mass. The proportion of the unpolymerizable (poly) alkylene glycol (B) not containing an alkenyl group to 100% by mass of the unsaturated (poly)alkylene glycol ether monomer (a) is preferably not less than 0.5% by mass in the production of the cement admixture having the above-mentioned constitution (1), or not less than 3% by mass in the production of the cement admixture having the above-mentioned constitution (2). If it is desired to lower that proportion to below the above range, it becomes necessary to reduce the proportion of the unpolymerizable (poly) alkylene glycol (B) not containing an alkenyl group formed as a byproduct in the production of the unsaturated (poly) alkylene glycol ether monomer (a). For achieving that purpose, a long period of time is required in the dehydration process step to remove active hydrogen-containing impurities, for example water, from various raw materials, for example the unsaturated alcohol, to be used in the alkylene oxide addition reaction, or remove such impurities occurring on the wall surface and/or gaseous phase portion of the reaction apparatus, and/or a purification step is required to remove the unpolymerizable (poly)alkylene glycol (B) not containing an alkenyl group after completion of the alkylene oxide addition reaction. This is unfavorable since the productivity of the monomer (a) decreases, for instance. For the constitution (1) mentioned above, the proportion of the unpolymerizable (poly)alkylene glycol (B) not containing an alkenyl group to 100% by mass of the unsaturated (poly)alkylene glycol ether monomer (a) is more preferably not less than 1% by mass, still more preferably not less than 2% by mass, most preferably not less than 2.5% by mass. As for the appropriate range, this is preferably 0.5 to 50% by mass, more preferably 1 to 40% by mass, still more preferably 2 to 30% by mass, most preferably 2.5 to 20% by mass. For the constitution (2) mentioned above, that proportion is more preferably not less than 3.5% by mass, still more preferably not less than 4% by mass, most preferably not less than 4.5% by mass. As regards the appropriate range, this is preferably 3 to 50% by mass, more preferably 3.5 to 40% by mass, still more preferably 4 to 30% by mass, most preferably 4.5 to 20% by mass.

The above unsaturated (poly)alkylene glycol ether monomer (a) may be added after production of the copolymer (A). Preferably, however, the polymerization reaction in the step of producing the copolymer (A) is stopped at the time when the unsaturated (poly)alkylene glycol ether monomer (a) used as a raw material remains in an amount of 1 to 100% by mass relative to the copolymer (A) in the case of the above constitution (1) or in an amount of 1 to 50% by mass in the case of the above constitution (2), whereby a cement admixture composition containing the unsaturated (poly) alkylene glycol ether monomer (a) in an amount of 1 to 100% by mass or 1 to 50% by mass, respectively, relative the copolymer (A) can favorably be obtained.

When, in the production of the cement admixture of the present invention, the proportion of the residual unsaturated (poly)alkylene glycol ether monomer (a) is below the range mentioned above, the slump loss preventing and viscosity reducing effects may be insufficient. Conversely, when it exceeds the above range, the dispersing ability to cement decrease. As for the time for stopping the polymerization reaction for the constitution (1), the time is more preferred when the unsaturated (poly)alkylene glycol ether monomer (a) remains in an amount, relative to the copolymer (A), of not less than 2% by mass, still more preferably not less than 3% by mass, particularly preferably not less than 4% by mass, most preferably not less than 5% by mass, but more preferably not more than 90% by mass, still more preferably not more than 80% by mass, particularly preferably not more than 70% by mass, most preferably not more than 50% by mass. As for the appropriate range, the time is preferred when the monomer (a) remains in an amount of 2 to 100% by mass, more preferably 3 to 90% by mass, still more preferably 4 to 80% by mass, particularly preferably 5 to 70% by mass, most preferably 5 to 50% by mass. For the constitution (2), the time for stopping the polymerization reaction is more preferred when the unsaturated (poly) alkylene glycol ether monomer (a) remains in an amount, relative to the copolymer (A), of not less than 2% by mass, still more preferably not less than 3% by mass, particularly preferably not less than 4% by mass, most preferably not less than 5% by mass, but more preferably not more than 45% by mass, still more preferably not more than 40% by mass. As for the appropriate range, the time is more preferred when the monomer (a) remains in an amount of 2 to 50% by mass, still more preferably 3 to 50% by mass, particularly preferably 4 to 45% by mass, most preferably 5 to 40% by mass.

After the production of the copolymer (A), an unsaturated (poly)alkylene glycol ether monomer (a) may further be added. The unsaturated (poly)alkylene glycol ether monomer (a) to be incorporated may be the same or different from the unsaturated (poly)alkylene glycol ether monomer (a) used as a monomer component in the copolymerization reaction.

A preferred method of producing the above copolymer (A) for obtaining the cement admixture of the present invention comprises carrying out the copolymerization reaction using, as a raw material composition, a composition containing the above-mentioned unpolymerizable (poly) alkylene glycol (B) not containing an alkenyl group in addition to the monomer component comprising, as essential components, the above-mentioned unsaturated (poly) alkylene glycol ether monomer (a) and unsaturated carboxylic acid monomer (b), and stopping the polymerization reaction at the time when the residual amount of the unsaturated (poly)alkylene glycol ether monomer (a) amounts to 1 to 100% by mass relative to the copolymer (A) in the case of constitution (1) or to 1 to 50% by mass relative to the copolymer (A) in the case of constitution (2). This method is preferred since the cement admixture of the present invention which comprises the three component, namely the copolymer (A), unsaturated (poly)alkylene glycol ether monomer (a) and unpolymerizable (poly)alkylene glycol (B) not containing an alkenyl group can be obtained with ease.

The cement admixture of the present invention comprises the three components, namely the copolymer (A), unsaturated (poly)alkylene glycol ether monomer (a) and unpolymerizable (poly)alkylene glycol (B) not containing an alkenyl group, as essential components. Such cement admixture may be used, as a main constituent of the cement admixture, in the form of an aqueous solution, or in the form of a powder prepared by neutralizing with the hydroxide of a divalent metal such as calcium or magnesium to give a polyvalent metal salt, followed by drying, or by causing the polymer or salt to be carried on an inorganic powder such as a fine silicic powder, followed by drying.

When the cement admixture is added to a cement composition, the cement admixture comprising the three components, namely the copolymer (A), unsaturated (poly) alkylene glycol ether monomer (a) and unpolymerizable (poly)alkylene glycol (B) not containing an alkenyl group, may be added, or the three components may be added separately and individually.

The cement admixture of the present invention can be used in various hydraulic materials, namely cement, gypsum and other cement compositions and in other hydraulic materials. Preferred examples of the hydraulic composition comprising a hydraulic material, water and the cement admixture according to the present invention, if necessary together with a fine aggregate (e.g. sand) and/or a coarse aggregate (e.g. crushed stone), are cement paste, mortar, concrete and plaster.

Among the hydraulic compositions mentioned above, cement compositions in which cement is used as the hydraulic material are in commonest use. Such cement compositions comprise the above-mentioned cement admixture, cement and water as essential constituents. Such cement compositions also constitute an aspect of the present invention.

Suited for use as the cement in the cement composition are portland cement species (ordinary, high-early-strength, ultra high-early-strength, moderate heat, sulfate persisting, and low alkali grades thereof), various blended cement species (blast furnace slag cement, silica cement, fly ash cement), white portland cement, alumina cement, ultra rapid hardening cement (one clinker ultra rapid hardening cement, two clinker ultra rapid hardening cement, magnesium phosphate cement), grouting cement, oil-well cement, lower calorific value cement (lower calorific value blast furnace slag cement, fly ash-mixed lower calorific value blast furnace slag cement, high belite cement), ultrahigh strength cement, cement-based hardening materials, and economical cement (cement produced by using at least one of municipal refuse incineration ash and sewage sludge incineration ash as a material). Fine powders such as blast furnace slag, fly ash, cinder ash, clinker ash, husk ash, silica fume, silica powder and limestone powder, and gypsum may further be added. Usable as the aggregate are gravel, crushed stone, water granulated blast furnace slag, recycled concrete aggregate and, further, fireproof aggregates such as silica stone-based, clay-based, zircon-based, high alumina, silicon carbide-based, graphite-based, chrome-based, chrome-magnesite, and magnesia-based ones.

As for the unit water amount, the amount of cement and the water/cement ratio in each cubic meter of the cement composition according to the present invention, the unit water amount of 100 to 185 kg/m$^3$, the amount of cement as used of 250 to 800 kg/m$^3$, and the water/cement ratio (mass ratio) of 0.1 to 0.7 are preferred. More preferably, the unit water amount of 120 to 175 kg/m$^3$, the amount of cement as used of 270 to 800 kg/m$^3$, and the water/cement ratio (mass ratio) of 0.2 to 0.65 are recommended for wide use in poor to rich mixtures. The cement admixture of the present invention can be used even in a high water reduction ratio range, namely in a low water/cement ratio range such as water/cement ratio (mass ratio)=0.15 to 0.5 (preferably 0.15 to 0.4) and, further, is effective in high strength concrete, in which the unit cement content is high, as well as in poor concrete, in which the unit cement content is not more than 300 kg/M$^3$.

The level of addition of the cement admixture of the present invention in the above cement composition is preferably 0.01 to 10.0% by mass of the mass, on the solid basis, of cement, when the admixture is used, for example, in mortar or concrete in which hydraulic cement is used. At such addition levels, various favorable effects, such as reduction in unit water amount, increase in strength and improvement in durability, are realized. When the above addition level is lower than 0.01% by mass, the performance characteristics may become insufficient. Conversely, when it exceeds 10.0% by mass, the effects will substantially reach the peak and this may be disadvantageous from the economical viewpoint. A more preferred addition level is 0.02% to 5.0% by mass, still more preferably 0.05 to 3.0% by mass, in particular 0.1 to 2.0% by mass.

The above cement composition is excellent in pumpability, markedly improves the workability on the construction work and has high flowability and, therefore, is effective in ready mixed concrete, concrete for secondary concrete products (precast concrete), centrifugal molded concrete, vibrating compacted concrete, steam cured concrete, concrete for spraying and the like and, further, it is effective also in mortar and concrete species required to have high flowability, such as medium flowing concrete (concrete showing a slump value of 22 to 25 cm), high flowing concrete (concrete showing a slump value of not less than 25 cm and a slump flow value of 50 to 70 cm), self-filling concrete and self-leveling materials.

The cement admixture of the present invention can be used in combination with one or more of the conventional cement dispersants. When a conventional cement dispersant is used, the mixing ratio between the cement admixture of the present invention and the conventional cement dispersant may vary depending on the conventional cement dispersant employed, the formulation, the test conditions and other factors, hence cannot be precisely specified. Preferably, the mixing ratio between the cement admixture of the present invention and the conventional cement dispersant is 1 to 99/99 to 1, more preferably 5 to 95/95 to 5, still more preferably 10 to 90/90 to 10, on the solid basis. Suited for use as the conventional cement dispersant to be used combinedly are sulfonic acid type dispersants (S) having a sulfonic acid group(s) in the molecule, and polycarboxylic acid type dispersants (PC) having a (poly)oxyalkylene group(s) and carboxyl groups in the molecule.

By using a sulfonic acid type dispersant (S) containing a sulfonic acid group in the molecule in combination, a cement admixture having high dispersion retaining ability, and showing a stable dispersing ability not depending on a cement brand or lot number, can be obtained. A sulfonic acid type dispersant (S) exhibits dispersing ability for cement due to the mainly sulfonic acid group-induced electrostatic repulsion. Various conventional sulfonic acid type dispersants may be used but a compound containing an aromatic group in the molecule is preferred. Specifically, there may be mentioned (poly)alkyl aryl sulfonate type such as naphthalenesulfonic acid-formaldehyde condensates, methylnaphthalenesulfonic acid-formaldehyde condensates, and anthracenesulfonic acid-formaldehyde condensates; melamineformalin resin sulfonate type such as melaminesulfonic acid-formaldehyde condensates; aromatic aminosulfonate type such as aminoarylsulfonic acid-phenol-formaldehyde condensates; ligninsulfonate type such as ligninsulfonates and modified ligninsulfonates; polystyrenesulfonate type, and like sulfonic acid type dispersants. When the water/cement ratio in concrete is high, ligninsulfonate type dispersants are preferably used. On the other hand, when the water/cement ratio in concrete is at middle level, (poly)alkyl aryl sulfonate type, melamineformalin resin sulfonate type, aromatic aminosulfonate type or polystyrenesulfonate type dispersants are preferably used, which have the higher dispersion ability. Further, two or more sulfonic acid type dispersants (S) containing a sulfonic acid group in the molecule may be used in combination.

An aqueous solution in which the cement admixture of the present invention and a sulfonic acid type dispersant (S) containing a sulfonic acid group in the molecule are dissolved together, prior to mixing a cement composition may be added to a cement. Further, aqueous solutions in which each component is dissolved respectively may be added respectively to a cement during mixing a cement composition, each component prepared in a powder form may be added to a cement during mixing a cement composition, and any aqueous solution and/or any component prepared in a powder form may be added to a cement during mixing a cement composition.

The ratio of the copolymer (A) in the cement admixture according to the present invention and a sulfonic acid type dispersant (S) containing a sulfonic acid group in the molecule, namely (copolymer (A)/sulfonic acid type dispersant (S)) (% by mass) varies depending on the performance balance between the cement admixture of the present invention and sulfonic acid type dispersant (S) containing a sulfonic acid group in the molecule used in combination, however, it is preferably 1 to 99/99 to 1, more preferably 5 to 95/95 to 5, still more preferably 10 to 90/90 to 10.

The addition proportion of the cement admixture which comprises as essential constituents, the cement admixture according to the present invention and a sulfonic acid type dispersant (S) containing a sulfonic acid group in the molecule to cement, when they applied to mortar or concrete using hydraulic cement, is preferably 0.01 to 10.0% on cement mass basis. It is more preferably 0.02 to 5.0%, still more preferably 0.05 to 2.0%.

When, in the practice of the present invention, a polycarboxylic acid type dispersant (PC), which is a polymer having a (poly)oxyalkylene group(s) and carboxyl groups in the molecule, is used combinedly, the combined use of such polymer different from the copolymer (A) in the cement admixture of the present invention provides a cement admixture excellent in balance between initial dispersing ability and slump loss preventing effect even in a high water reduction ratio range.

As the (poly)oxyalkylene group, which is an essential structure in the above polycarboxylic acid type cement dispersant (PC), there may be mentioned oxyalkylene groups containing 2 to 18 carbon atoms, or (poly) oxyalkylene groups resulting from addition of one or more, on average, of one or more of such oxyalkylene groups, preferably polyoxyalkylene groups resulting from addition of not less than 2 moles on average, more preferably polyoxyalkylene groups resulting from addition of not less than 3 moles on average, still more preferably polyoxyalkylene groups resulting from addition of not less than 4 moles on average. The number of carbon atoms in the above oxyalkylene group is appropriately within the range of 2 to 18, preferably within the range of 2 to 8, more preferably 2 to 4. As for those adducts resulting from addition of two or more alkylene oxides arbitrarily selected from among ethylene oxide, propylene oxide, butylene oxide, styrene oxide and the like, the mode of addition may be of the random, block, alternating or other type. Preferably, however, the oxyalkylene groups comprises the oxyethylene group as an essential constituent and, more preferably, the oxyethylene group accounts for not less than 50 mole %.

As specific examples of the above-mentioned polycarboxylic acid type dispersant (PC), there may be mentioned, among others, polymers (polymers (PC1)) comprising, as essential constituent units, the constituent unit (III) derived from a (poly)alkylene glycol mono(meth)acrylic acid ester monomer (c) represented by the above general formula (3) and the constituent unit (II) derived from an unsaturated carboxylic acid monomer (b); polymers (polymers (PC2)) comprising, as essential constituent units, the constituent unit (V) derived from an unsaturated (poly)alkylene glycol ether monomer (e) represented by the general formula (5):

(in the formula, Z represents an alkenyl group containing 2 to 4 carbon atoms, the p $R^{14}O$ groups may be the same or different and each represents an oxyalkylene group containing 2 to 18 carbon atoms, $R^{15}$ represents a hydrogen atom or a hydrocarbon group containing 1 to 30 carbon atoms, and p is the mean addition number of moles of the oxyalkylene group and represents a number of 1 to 500.) and the constituent unit (II) derived from an unsaturated carboxylic acid monomer (b); and hydrophilic graft polymers derived from polyether compounds and unsaturated carboxylic acid monomers by graft polymerization, as described in Japanese Kokai Publication Hei-07-53645, Japanese Kokai Publication Hei-08-208769 and Japanese Kokai Publication Hei-08-208770. Among them, the polymer (PC1) or (PC2) is preferably used. The polymers (PC1) and polymers (PC2) may be used respectively singly or in combination of two or more species.

Referring to the above general formula (5), the $R^{14}O$ group and preferred species thereof are the same as in the case of the oxyalkylene group $R^1O$ mentioned hereinabove. The $R^{15}$ group and preferred species thereof are the same as the $R^2$ mentioned hereinabove. Suited as Z are vinyl, allyl, methallyl and 3-butenyl.

In the above polymer (PC1) and polymer (PC2), it is preferred that the number of milliequivalents (meq/g) of carboxyl group contained in each gram of the polymer as determined on the unneutralized basis be 0.1 to 6.0 meq/g. It is thus preferred that the proportion of each constituent unit constituting the polymer be selected so that the number of milliequivalents of carboxyl group in the polymer amount to a value within the above range. The number of milliequivalents (meq/g) of carboxyl group contained in each gram of the polymer is more preferably 0.2 to 5.0, still more preferably 0.2 to 4.5, particularly preferably 0.3 to 4.0, most preferably 0.3 to 3.5.

An aqueous solution in which the cement admixture of the present invention and a polycarboxylic acid type dispersant (PC) are dissolved together, prior to mixing a cement composition may be added to a cement. Further, aqueous solutions in which each component is dissolved respectively may be added respectively to a cement during mixing a cement composition, each component prepared in a powder form may be added to a cement during mixing a cement composition, and any aqueous solution and/or any component prepared in a powder form may be added to a cement during mixing a cement composition.

The ratio of the copolymer (A) in the cement admixture according to the present invention and a polycarboxylic acid type dispersant (PC), namely (copolymer (A)/polycarboxylic acid type dispersant (PC)) (% by mass) varies depending on the performance balance between the cement admixture of the present invention and polycarboxylic acid type dispersant (PC) used in combination, however, it is preferably 1 to 99/99 to 1, more preferably 5 to 95/95 to 5, still more preferably 10 to 90/90 to 10.

The level of addition of the cement admixture comprising, as essential constituents, the cement admixture of the present invention and the polycarboxylic acid type dispersant (PC) relative to cement is preferably 0.01 to 10.0%, more preferably 0.02 to 5.0%, still more preferably 0.05 to 2.0%, of the mass of cement, when it is used, for example, in mortar or concrete in which hydraulic cement is used.

The above cement composition may further comprise one or more of other known cement additives (ingredients) such as listed below under (1) to (20):

(1) Water-soluble polymeric substances: unsaturated carboxylic acid polymers such as polyacrylic acid (sodium salt), polymethacrylic acid (sodium salt), polymaleic acid (sodium salt), and acrylic acid-maleic acid copolymer sodium salt; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharide derivatives derived from alkylated or hydroxyalkylated derivatives of polysaccharides, such as methylcellulose, ethylcellulose, hydroxyethylcellulose and hydroxypropylcellulose, by substitution of a part or all of hydroxyl hydrogen atoms with a hydrophobic substituent comprising a hydrocarbon chain containing 8 to 40 carbon atoms as a partial structure and an ionic hydrophilic substituent containing a sulfonic acid group or a salt thereof as a partial structure; yeast glucans, xanthan gum, β-1,3-glucans (linear or branched, e.g. curdlan, paramylon, pachyman, scleroglucan, laminaran) and like polysaccharides produced by microbial fermentation; polyacrylamide; polyvinyl alcohol; starch; starch phosphoric acid ester; sodium alginate; gelatin; amino-containing acrylic acid copolymers and quaternization products derived therefrom.

(2) Polymer emulsions: copolymers of various vinyl monomer such as alkyl (meth)acrylates.

(3) Retarders: hydroxycarboxylic acids such as gluconic acid, glucoheptonic acid, arabonic acid, malic acid, citric acid, and inorganic or organic salts thereof such as sodium, potassium, calcium, magnesium, ammonium and triethanolamine salts; monosaccharides such as glucose, fructose, galactose, saccharose, xylose, apiose, ribose and invert sugar, oligosaccharides such as disaccharides and trisaccharides, such oligosaccharides as dextrin, polysaccharides such as dextran, and other saccharides such as molasses containing these; sugar alcohols such as sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as aminotri (methylenephosphonic acid), 1-hydroxyethylidene-1,1-diphosphonic acid, ethylenediaminetetra (methylenephosphonic acid), diethylenetriaminepenta (methylenephosphonic acid), and alkali metal or alkaline earth metal salts thereof, etc.

(4) Early strengthening agents/accelerators: soluble calcium salts such as calcium chloride, calcium nitrite, calcium nitrate, calcium bromide and calcium iodide; chlorides such as iron chloride and magnesium chloride; hydrosulfate; potassium hydroxide; sodium hydroxide; carbonates; thiosulfates; formic acid and formates such as calcium formate; alkanolamines; alumina cement; calcium aluminosilicate, etc.

(5) Mineral oil-based antifoaming agents: kerosene, liquid paraffin, etc.

(6) Fat- or oil-based antifoaming agents: animal or vegetable oils, sesame oil, castor oil, alkylene oxide adducts derived therefrom, etc.

(7) Fatty acid-based antifoaming agents: oleic acid, stearic acid, and alkylene oxide adducts derived therefrom, etc.

(8) Fatty acid ester-based antifoaming agents: glycerol monoricinolate, alkenylsuccinic acid derivatives, sorbitol monolaurate, sorbitol trioleate, natural waxes, etc.

(9) Oxyalkylene type antifoaming agents

(10) Alcohol-based antifoaming agents: octyl alcohol, hexadecyl alcohol, acetylene alcohols, glycols, etc.

(11) Amide-based antifoaming agents: acrylate polyamines, etc.

(12) Phosphate ester-based antifoaming agents: tributyl phosphate, sodium octylphosphate, etc.

(13) Metal salt-based antifoaming agents: aluminum stearate, calcium oleate, etc.

(14) Silicone-based antifoaming agents: diemthylsilicone oil, silicone paste, silicone emulsions, organic group-modified polysiloxanes (polyorganosiloxanes such as dimethylpolysiloxane), fluorosilicone oils, etc.

(15) Air-entraining (AE) agents: resin soaps, saturated or unsaturated fatty acids, sodium hydroxystearate, lauryl sulfate, ABSs (alkylbenzenesulfonates), LASs (linear alkylbenzenesulfonates), alkanesulfonates, polyoxyethylene alkyl(phenyl) ethers, polyoxyethylene alkyl(phenyl) ether sulfate esters or salts thereof, polyoxyethylene alkyl (phenyl) ether phosphate esters or salts thereof, proteinic materials, alkenylsulfosuccinates, α-olefinsulfonates, etc.

(16) Other surfactants: polyalkylene oxide derivatives derived from monofunctional mercaptans containing 6 to 30 carbon atoms within the molecule, such as dodecylmercaptan, amines containing 6 to 30 carbon atoms within the molecule, such as dodecylamine, or carboxylic acids containing 6 to 30 carbon atoms within the molecule, such as lauric acid and stearic acid, by addition of not less than 10 moles of an alkylene oxide(s) such as ethylene oxide and/or propylene oxide; alkyldiphenyl ether sulfonates in which two sulfo-containing phenyl groups, which may optionally have an alkyl group or alkoxy group as a substituent, is bonded via ether bonding; various anionic surfactants; various cationic surfactants such as alkylamine acetates and alkyltrimethylammonium chlorides; various nonionic surfactants; various amphoteric surfactants, etc.

(17) Waterproofing agents: fatty acids (salts), fatty acid esters, fats and oils, silicones, paraffins, asphalt, waxes, etc.

(18) Rust preventives: nitrites, phosphates, zinc oxide, etc.

(19) Cracking reducing agents: polyoxyalkyl ethers etc.

(20) Expansive admixtures: ettringite type, coal-derived type, etc.

As other conventional cement additives (ingredients), there may be mentioned cement wetting agents, thickening agents, separation reducing agents, flocculants, drying shrinkage reducing agents, strength increasing agents, self-leveling agents, rust preventives, colorants, antifungal agents and so on. These cement additives (ingredients) may be used singly or two or more may be used in combination.

The following combinations (1) to (8) of constituents other than cement and water in the above cement composition may be mentioned as particularly preferred embodiments:

(1) Combination of ① the cement admixture according to the present invention and ② an oxyalkylene type antifoaming agent as two essential constituents. The proportion of the oxyalkylene type antifoaming agent ② is preferably 0.01 to 20% by mass relative to the cement admixture ①.

(2) Combination of ① the cement admixture of the present invention, ② a polycarboxylic acid type dispersant (PC), which is a polymer having a (poly)oxyalkylene group(s) and carboxyl groups in the molecule, and ③ an oxyalkylene type antifoaming agent as three essential constituents. The mixing ratio by mass between the cement admixture ① and the polycarboxylic acid type dispersant (PC) ② is preferably 5/95 to 95/5, more preferably 10/90 to 90/10. The proportion, by mass, of the oxyalkylene antifoaming agent ③ is preferably 0.01 to 20% by mass relative to the total amount of the cement admixture ① and polycarboxylic acid type dispersant (PC) ②.

(3) Combination of ① a cement admixture according to the present invention and ② a material separation reducing agent as two essential constituents. Usable as the material separation reducing agent are various thickening agents such as nonionic cellulose ethers, and compounds containing, as partial structures, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing ratio, by mass, between the cement admixture ① and material separation reducing agent ② is preferably 10/90 to 99.99/0.01, more preferably 50/50 to 99.9/0.1. Cement compositions containing this combination are suited for use as high flowing concrete, self-filling concrete and self-leveling compositions.

(4) Combination of ① a cement admixture according to the present invention and ② a retarder as two essential constituents. Usable as the retarder are hydroxycarboxylic acids such as gluconic acid (salts) and citric acid (salts); saccharides such as glucose; sugar alcohols such as sorbitol; and phosphonic acids such as aminotri (methylenephosphonic acid), among others. The mixing ratio, by mass, between the cement admixture ① and retarder ② is preferably 50/50 to 99.9/0.1, more preferably 70/30 to 99/1. By adding the retarder, the slump loss preventing effect at high temperature can be particularly improved.

(5) Combination of ① a cement admixture according to the present invention and ② a accelerator as two essential constituents. Usable as the accelerator are soluble calcium salts such as calcium chloride, calcium nitrite and calcium nitrate; chlorides such as iron chloride and magnesium chloride; thiosulfates; formic acid, and formates such as calcium formate, among others. The mixing ratio, by mass, between the cement admixture ① and accelerator ② is preferably 10/90 to 99.9/0.1, more preferably 20/80 to 99/1.

(6) Combination of ① the cement admixture of the present invention, ② a sulfonic acid type dispersant (S) having a sulfonic acid group(s) in the molecule and ③ a retarder as three essential constituents. Usable as the sulfonic acid type dispersant are ligninsulfonates, naphthalenesulfonic acid-formaldehyde condensates, melaminesulfonic acid-formaldehyde condensates, polystyrenesulfonates, aminoarylsulfonic acid-phenol-formaldehyde condensates and like. Usable as the retarder are hydroxycarboxylic acids such as gluconic acid (salts) and citric acid (salts); saccharides such as glucose; sugar alcohols such as sorbitol; phosphonic acids such as aminotri (methylenephosphonic acid), among others. The mixing ratio by mass between the cement admixture ① and the sulfonic acid type dispersant (S) having a sulfonic acid group(s) in the molecule ② is preferably 5/95 to 95/5, more preferably 10/90 to 90/10. The mixing ratio by mass between the sum of the cement admixture ① and the sulfonic acid type dispersant (S) having a sulfonic acid group(s) in the molecule ② and the retarder ③, (the sum of ① and ②)/③, is preferably 40/60 to 99.9/0.1, more preferably 60/40 to 99/1.

(7) Combination of ① the cement admixture of the present invention, ② a ligninsulfonate and ③ a retarder as three essential ingredients. Usable as the retarder are hydroxycarboxylic acids such as gluconic acid (salts) and citric acid (salts); saccharides such as glucose; sugar alcohols such as sorbitol; phosphonic acids such as aminotri (methylenephosphonic acid), among others. Among them, gluconic acid (or a salt thereof) is preferred. The mixing ratio by mass between the cement admixture ① and ligninsulfonate ② is preferably 5/95 to 95/5, preferably 10/90 to 90/10. The mixing ratio by mass between the sum of the cement admixture ① and ligninsulfonate ② and the retarder ③, (the sum of ① and ②)/③, is preferably 40/60 to 99.9/0.1, more preferably 60/40 to 99/1.

(8) Combination of ① the cement admixture of the present invention, ② a ligninsulfonate, ③ a retarder, and ④ an antifoaming agent and/or ⑤ an AE agent as four or five essential ingredients. Usable as the retarder are hydroxycarboxylic acids such as gluconic acid (salts) and citric acid (salts); saccharides such as glucose; sugar alcohols such as sorbitol; phosphonic acids such as aminotri (methylenephosphonic acid), among others. Among them, gluconic acid (or a salt thereof) is preferred. Usable as the antifoaming agent are an oxyalkylene type antifoaming agent, a silicone-based antifoaming agent and a fatty acid ester-based antifoaming agent, among others. Among them, the oxyalkylene type antifoaming agent is preferred. The mixing ratio by mass between the cement admixture ① and ligninsulfonate ② is preferably 5/95 to 95/5, more preferably 10/90 to 90/10. The mixing ratio by mass between the sum of the cement admixture ① and ligninsulfoniate ② and the retarder ③, (the sum of ① and ②)/③, is preferably 40/60 to 99.9/0.1, more preferably 60/40 to 99/1. The proportion, by mass, of the antifoaming agent ④ is preferably 0.01 to 20% by mass relative to the cement admixture ①. The proportion, by mass, of the AE agent ⑤ is preferably 0.001 to 2% by mass relative to the cement.

The cement admixture of the present invention produces high levels of dispersing ability and slump loss preventing effect and also produces a viscosity reducing effect and, furthermore, exhibits these characteristics satisfactorily even in a high water reduction ratio range. The cement composition containing the cement admixture of the present invention can be pumped with ease and give concrete with good workability, hence the workability can be improved and the troubles possible encountered in construction can be alleviated.

BEST MODES FOR CARRYING OUT THE INVENTION

The following examples illustrate the present invention more specifically. They are, however, by no means limitative of the scope of the invention. In the examples, "%" denotes "% by mass" and "part(s)" means "part(s) by mass", unless otherwise specified.

In the production examples of an unsaturated (poly) alkylene glycol ether monomer, the amount of the non-polymerizable polyalkylene glycol not containing an alkenyl group formed as a byproduct was determined on the following conditions.

<Determination Conditions of Production Amount of Non-polymerizable Polyalkylene Glycol not Containing an Alkenyl Group>

Apparatus: LC-10 (product of Shimadzu Corp.)
Detector: differential refractometer (RI) detector (trademark: HITACHI 3350 RI MONITOR, product of Hitachi Corp.)
Eluent: species: deionized water
  flow rate: 1.5 ml/min
Column: species: product of Showa Denko Corp., trademark "Shodex GF-310" (4.6×300 mm)
  temperature: 40° C.

In the production examples of a cement admixture, the reaction rate (conversion) of each monomer and the weight average molecular weight of each copolymer obtained were determined under the following conditions.

<Determination Conditions of Conversion of Starting Monomer>

Apparatus: Borwin (trademark, product of JASCO Corp.)
Detector: differential refractometer (RI) detector (trademark: HITACHI 3350 RI MONITOR, product of Hitachi Corp.)
Eluent: species: acetonitrile/0.1% deionized water solution of phosphoric acid (50/50% by volume)
flow rate: 1.0 ml/min
Column: species: product of Tosoh Corp., "ODS-120T" (trademark)+"ODS-80Ts" (trademark) (each 4.6×250 mm)
temperature: 40° C.

<Determination Conditions of Weight Average Molecular Weight of Copolymer>

Apparatus: Waters LCM1 (trademark, product of Waters Corp.)
Detector: differential refractometer (RI) detector (trademark: Waters 410, product of Waters Corp.)
Eluent: species: acetonitrile/0.05 M deionized water solution of sodium acetate (40/60% by volume), adjusted to pH 6.0 with acetic acid
flow rate: 0.6 ml/min
Column: species: product of Tosoh Corp., "TSK-GEL G4000SWXL" (trademark)+"G3000SWXL" (trademark)+"G2000SWXL" (trademark)+"GUARD COLUMN" (trademark) (each 7.8×300 mm, 6.0×40 mm)
temperature: 40° C.
Working curve: polyethylene glycol standards

PRODUCTION EXAMPLE 1

A stainless-made high pressure reaction vessel equipped with a thermometer, a stirrer, and a nitrogen and alkylene oxide inlet tube was charged with 234 parts of 3-methyl-3-buten-1-ol as an unsaturated alcohol and 3.1 parts of sodium hydroxide as a catalyst for addition reaction. Reaction vessel inside was purged with nitrogen with stirring and then heated to 120° C. in a nitrogen atmosphere. Then, under safe pressure, maintaining the temperature at 120° C., 6,418 parts of ethylene oxide was introduced to the reaction vessel. The temperature was maintained at 120° C. until the alkylene oxide addition reaction was completed to drive the reaction to completion. The obtained reaction product (hereinafter referred to as M-1) includes a polyalkylene glycol (polyethylene glycol) as a by-product, and an unsaturated polyalkylene glycol ether monomer (hereinafter referred to as IPN-50) derived from 3-methyl-3-buten-1-ol by addition of 50 moles, on average, of ethylene oxide. The production amount of polyethylene glycol was 6.7% relative to the unsaturated polyalkylene glycol ether monomer.

PRODUCTION EXAMPLES 2 AND 3

The same procedure as in Production Example 1 was followed except that the species and used level of alkylene oxide, and the used level of unsaturated alcohol and sodium hydroxide as the catalyst for addition reaction were changed as shown in Table 1, to perform alkylene oxide addition reaction to the unsaturated alcohol, to give reaction products (M-2) to (M-3) which included an unsaturated polyalkylene glycol ether monomer and a polyalkylene glycol. Furthermore, the alkylene oxide addition reaction was always carried out at 120° C., and when two species of alkylene oxide, ethylene oxide and propylene oxide were used, whole ethylene oxide addition to unsaturated alcohol was performed, then propylene oxide addition was performed to obtain block type adduct. The production amount of the polyalkylene glycol as a by-product relative to the unsaturated polyalkylene glycol ether monomer in obtained reaction product is shown in Table 1.

TABLE 1

| Production Example | Reaction Product No. | Abbreviation of unsaturated polyalkylene glycol ether monomer | Unsaturated alcohol Species | Unsaturated alcohol Used level (parts) | Ethylene oxide Used level (parts) | Ethylene oxide Mean number of moles added | Propylene oxide Used level (parts) | Propylene oxide Mean number of moles added | Sodium hydroxide Used level (parts) | By-product polyalkylene glycol Species | By-product polyalkylene glycol Production amount (%) |
|---|---|---|---|---|---|---|---|---|---|---|---|
| 1 | M-1 | IPN-50 | 3-methyl-3-butene-1-ol | 234 | 6418 | 50 | — | — | 3.1 | polyethylene glycol | 6.7 |
| 2 | M-2 | IPN-100 | 3-methyl-3-butene-1-ol | 117 | 6575 | 100 | — | — | 3.1 | polyethylene glycol | 9.4 |
| 3 | M-3 | IPN-50EO3PO | 3-methyl-3-butene-1-ol | 117 | 3228 | 50 | 250 | 3 | 1.7 | polyethylene polypropylene glycol | 7.2 |

PRODUCTION EXAMPLE 4

Production of Cement Admixture (1)

A glass-made reaction vessel equipped with a thermometer, a stirrer, a dropping funnel, a nitrogen inlet tube, and a reflux condenser was charged with 271 parts of deionized water, and 426.8 parts of the reaction product (M-1) obtained by Production Example 1 (containing 400 parts of IPN-50 and 26.8 parts of polyethylene glycol), and the temperature was raised to 65° C. While maintaining the reaction vessel at 65° C., an aqueous hydrogen peroxide solution composed of 0.441 part of hydrogen peroxide and 8.37 parts of deionized water was added thereto. Then, 34.0 parts of acrylic acid was added dropwise to the reaction vessel over 3 hours, and at the same time, an aqueous solution prepared by dissolving 0.571 part of L-ascorbic acid and 1.38 parts of 3-mercaptopropionic acid in 10.84 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (1) according to the present invention.

PRODUCTION EXAMPLE 5

Production of Cement Admixture (2)

A glass-made reaction vessel equipped with a thermometer, a stirrer, a dropping funnel, a nitrogen inlet tube, and a reflux condenser was charged with 271 parts of deionized water, and 437.6 parts of the reaction product (M-2) obtained by Production Example 2 (containing 400 parts of IPN-100 and 37.6 parts of polyethylene glycol), and the temperature was raised to 65° C. While maintaining the reaction vessel at 65° C., an aqueous hydrogen peroxide solution composed of 0.278 part of hydrogen peroxide and 5.29 parts of deionized water was added thereto. Then, 23.1 parts of acrylic acid was added dropwise to the reaction vessel over 3 hours, and at the same time, an aqueous solution prepared by dissolving 0.361 part of L-ascorbic acid and 1.09 parts of 3-mercaptopropionic acid in 6.85 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 57%. The reaction mixture was then neutralized to pH 7 with an aqueous solution of sodium hydroxide at a temperature not higher than the polymerization reaction temperature to give the cement admixture (2) according to the present invention.

PRODUCTION EXAMPLE 6

Production of Cement Admixture (3)

A glass-made reaction vessel equipped with a thermometer, a stirrer, a dropping funnel, a nitrogen inlet tube, and a reflux condenser was charged with 273 parts of deionized water, and 428.8 parts of the reaction product (M-3) obtained by Production Example 3 (containing 400 parts of IPN-50E03PO and 28.8 parts of polyethylenepolypropylene glycol), and the temperature was raised to 65° C. While maintaining the reaction vessel at 65° C., an aqueous hydrogen peroxide solution composed of 0.400 part of hydrogen peroxide and 7.60 parts of deionized water was added thereto. Then, 34.0 parts of acrylic acid was added dropwise to the reaction vessel over 3 hours, and at the same time, an aqueous solution prepared by dissolving 0.518 part of L-ascorbic acid and 1.25 parts of 3-mercaptopropionic acid in 9.85 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (3) according to the present invention.

PRODUCTION EXAMPLE 7

Production of Cement Admixture (4)

A glass-made reaction vessel equipped with a thermometer, a stirrer, a dropping funnel, a nitrogen inlet tube, and a reflux condenser was charged with 276 parts of deionized water, and 426.8 parts of the reaction product (M-1) obtained by Production Example 1 (containing 400 parts of IPN-50 and 26.8 parts of polyethylene glycol), and the temperature was raised to 65° C. While maintaining the reaction vessel at 65° C., an aqueous hydrogen peroxide solution composed of 0.517 part of hydrogen peroxide and 9.82 parts of deionized water was added thereto. Then, 35.0 parts of acrylic acid and 11.4 parts of 2-hydroxyethyl acrylate were added dropwise to the reaction vessel over 3 hours, and at the same time, an aqueous solution prepared by dissolving 0.669 part of L-ascorbic acid and 1.61 parts of 3-mercaptopropionic acid in 12.71 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (4) according to the present invention.

PRODUCTION EXAMPLE 8

Production of Cement Admixture (5)

A glass-made reaction vessel equipped with a thermometer, a stirrer, a dropping funnel, a nitrogen inlet tube, and a reflux condenser was charged with 279 parts of deionized water, 426.8 parts of the reaction product (M-1) obtained by Production Example 1 (containing 400 parts of IPN-50 and 26.8 parts of polyethylene glycol), and 41.4 parts of maleic acid, and the temperature was raised to 65° C. While maintaining the reaction vessel at 65° C., an aqueous hydrogen peroxide solution composed of 0.362 part of hydrogen peroxide and 6.88 parts of deionized water was added thereto. Then, an aqueous solution prepared by dissolving 0.469 part of L-ascorbic acid in 8.90 parts of deionized water was added dropwise over 1 hour to the reaction vessel. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (5) according to the present invention.

PRODUCTION EXAMPLE 9

Production of Cement Admixture (6)

A glass-made reaction vessel equipped with a thermometer, a stirrer, a dropping funnel, a nitrogen inlet tube, and a reflux condenser was charged with 273 parts of deionized water, 437.6 parts of the reaction product (M-2) obtained by Production Example 2 (containing 400 parts of IPN-100 and 37.6 parts of polyethylene glycol), and 21.8 parts of maleic acid, and the temperature was raised to 65° C. While maintaining the reaction vessel at 65° C., an aqueous hydrogen peroxide solution composed of 0.189 part of hydrogen peroxide and 3.58 parts of deionized water was added thereto. Then, an aqueous solution prepared by dissolving 0.244 part of L-ascorbic acid in 4.64 parts of deionized water was added dropwise over 1 hour to the reaction vessel. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 57%. The reaction mixture was then neutralized to pH 7 with an aqueous solution of sodium hydroxide at a temperature not higher than the polymerization reaction temperature to give the cement admixture (6) according to the present invention.

PRODUCTION EXAMPLE 10

Production of Cement Admixture (7)

A glass-made reaction vessel equipped with a thermometer, a stirrer, a dropping funnel, a nitrogen inlet tube, and a reflux condenser was charged with 280 parts of deionized water, 426.8 parts of the reaction product (M-1) obtained by Production Example 1 (containing 400 parts of IPN-50 and 26.8 parts of polyethylene glycol), and 34.1 parts of maleic acid, and the temperature was raised to 65° C. While maintaining the reaction vessel at 65° C., an aqueous hydrogen peroxide solution composed of 0.489 part of hydrogen peroxide and 9.29 parts of deionized water was added thereto. Then, 18.0 parts of acrylic acid was added dropwise to the reaction vessel over 3 hours, and at the same time, an aqueous solution prepared by dissolving 0.634 part of L-ascorbic acid in 12.04 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (7) according to the present invention.

PRODUCTION EXAMPLE 11

Production of Cement Admixture (8)

A glass-made reaction vessel equipped with a thermometer, a stirrer, a dropping funnel, a nitrogen inlet tube, and a reflux condenser was charged with 284 parts of deionized water, 426.8 parts of the reaction product (M-1) obtained by Production Example 1 (containing 400 parts of IPN-50 and 26.8 parts of polyethylene glycol), and 42.7 parts of maleic acid, and the temperature was raised to 65° C. While maintaining the reaction vessel at 65° C., an aqueous hydrogen peroxide solution composed of 0.438 part of hydrogen peroxide and 8.32 parts of deionized water was added thereto. Then, 11.8 parts of 2-hydroxyethyl acrylate was added dropwise to the reaction vessel over 3 hours, and at the same time, an aqueous solution prepared by dissolving 0.567 part of L-ascorbic acid in 10.78 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 58%. The reaction mixture was then neutralized to pH 7 with an aqueous solution of sodium hydroxide at a temperature not higher than the polymerization reaction temperature to give the cement admixture (8) according to the present invention.

PRODUCTION EXAMPLE 12

Production of Cement Admixture (9)

A glass-made reaction vessel equipped with a thermometer, a stirrer, a dropping funnel, a nitrogen inlet tube, and a reflux condenser was charged with 187 parts of deionized water, and 426.8 parts of the reaction product (M-1) obtained by Production Example 1 (containing 400 parts of IPN-50 and 26.8 parts of polyethylene glycol), and the temperature was raised to 65° C. While maintaining the reaction vessel at 65° C., an aqueous hydrogen peroxide solution composed of 0.354 part of hydrogen peroxide and 6.72 parts of deionized water was added thereto. Then, 24.8 parts of acrylic acid was added dropwise to the reaction vessel over 3 hours, and at the same time, an aqueous solution prepared by dissolving 0.458 part of L-ascorbic acid and 1.38 parts of 3-mercaptopropionic acid in 8.70 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 65%. The reaction mixture was then neutralized to pH 7 with an aqueous solution of sodium hydroxide at a temperature not higher than the polymerization reaction temperature to give the cement admixture (9) according to the present invention.

PRODUCTION EXAMPLE 13

Production of Cement Admixture (10)

A glass-made reaction vessel equipped with a thermometer, a stirrer, a dropping funnel, a nitrogen inlet tube, and a reflux condenser was charged with 206 parts of deionized water, and 426.8 parts of the reaction product (M-1) obtained by Production Example 1 (containing 400 parts of IPN-50 and 26.8 parts of polyethylene glycol), and the temperature was raised to 65° C. While maintaining the reaction vessel at 65° C., an aqueous hydrogen peroxide solution composed of 0.396 part of hydrogen peroxide and 7.53 parts of deionized water was added thereto. Then, 27.0 parts of acrylic acid and 35.3 parts of methoxypolyethylene glycol monoacrylate, in which the mean addition number of moles of ethylene oxide was 25, were added dropwise to the reaction vessel over 3 hours. At the same time, an aqueous solution prepared by dissolving 0.513 part of L-ascorbic acid and 1.55 parts of 3-mercaptopropionic acid in 9.75 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 65%. The reaction mixture was then neutralized to pH 7 with an aqueous solution of sodium hydroxide at a temperature not higher than the polymerization reaction temperature to give the cement admixture (10) according to the present invention.

PRODUCTION EXAMPLE 14

Production of Cement Admixture (11)

A glass-made reaction vessel equipped with a thermometer, a stirrer, a dropping funnel, a nitrogen inlet tube, and a reflux condenser was charged with 187 parts of deionized water, 426.8 parts of the reaction product (M-1) obtained by Production Example 1 (containing 400 parts of IPN-50 and 26.8 parts of polyethylene glycol), and 3.78 parts of a higher (containing 12 to 14 carbon atoms) alcohol-oxyethyleneoxypropylene adduct (polyoxyalkylene alkyl ether type antifoaming agent), and the temperature was raised to 65° C. While maintaining the reaction vessel at 65° C., an aqueous hydrogen peroxide solution composed of 0.354 part of hydrogen peroxide and 6.72 parts of deionized water was added thereto. Then, 24.8 parts of acrylic acid was added dropwise to the reaction vessel over 3 hours, and at the same time, an aqueous solution prepared by dissolving 0.458 part of L-ascorbic acid and 1.38 parts of 3-mercaptopropionic acid in 8.70 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 65%. The reaction mixture was then neutralized to pH 7 with an aqueous solution of sodium hydroxide at a temperature not higher than the polymerization reaction temperature to give the cement admixture (11) according to the present invention.

PRODUCTION EXAMPLE 15

Production of Cement Admixture (12)

A glass-made reaction vessel equipped with a thermometer, a stirrer, a dropping funnel, a nitrogen inlet tube, and a reflux condenser was charged with 279 parts of deionized water, 426.8 parts of the reaction product (M-1) obtained by Production Example 1 (containing 400 parts of IPN-50 and 26.8 parts of polyethylene glycol), and 34.1 parts of maleic acid, and the temperature was raised to 65° C. While maintaining the reaction vessel at 65° C., an aqueous hydrogen peroxide solution composed of 0.334 part of hydrogen peroxide and 6.34 parts of deionized water was added thereto. Then, 23.5 parts of methoxypolyethylene glycol monoacrylate, in which the mean addition number of moles of the ethylene oxide was 25, was added dropwise to the reaction vessel over 3 hours, and at the same time, an aqueous solution prepared by dissolving 0.432 part of L-ascorbic acid in 8.21 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 65%. The reaction mixture was then neutralized to pH 7 with an aqueous solution of sodium hydroxide at a temperature not higher than the polymerization reaction temperature to give the cement admixture (12) according to the present invention.

PRODUCTION EXAMPLE 16

Production of Comparative Cement Admixture (1)

A glass-made reaction vessel equipped with a thermometer, a stirrer, a dropping funnel, a nitrogen inlet tube, and a reflux condenser was charged with 198 parts of deionized water and 400 parts of unsaturated polyalkylene glycol ether monomer (not containing polyalkylene glycol) derived from 3-methyl-3-buten-1-ol by addition of 10 moles, on average, of ethylene oxide. Then the temperature was rised to 65° C. While maintaining the reaction vessel at 65° C., an aqueous hydrogen peroxide solution composed of 11.54 parts of hydrogen peroxide and 103.9 parts of deionized water was added thereto. Then, 250.7 parts of acrylic acid was added dropwise to the reaction vessel over 3 hours, and at the same time, an aqueous solution prepared by dissolving 14.94 parts of L-ascorbic acid and 4.50 parts of 3-mercaptopropionic acid in 134.5 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give the comparative cement admixture (1).

PRODUCTION EXAMPLE 17

Production of Comparative Cement Admixture (2)

A glass-made reaction vessel equipped with a thermometer, a stirrer, a dropping funnel, a nitrogen inlet tube, and a reflux condenser was charged with 1715 parts of deionized water, and the temperature was raised to 65° C. While maintaining the reaction vessel at 65° C., an aqueous hydrogen peroxide solution composed of 0.308 part of hydrogen peroxide and 5.85 parts of deionized water was added thereto. Then, 32.2 parts of maleic acid, and a mixture composed of 100 parts of deionized water and 400 parts of unsaturated polyalkylene glycol ether monomer (not containing polyalkylene glycol) derived from 3-methyl-3-buten-1-ol by addition of 50 moles, on average, of ethylene oxide were respectively added dropwise to the reaction vessel over 3 hours. At the same time, an aqueous solution prepared by dissolving 0.399 part of L-ascorbic acid in 7.58 parts of deionized water was added dropwise over 3.5 hours thereto. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 20%. The reaction mixture was then neutralized to pH 7 with an aqueous solution of sodium hydroxide at a temperature not higher than the polymerization reaction temperature to give the comparative cement admixture (2).

PRODUCTION EXAMPLE 18

Production of Comparative Cement Admixture (3)

The comparative cement admixture (3) was prepared by admixing 5.92 parts of polyethylene glycol (weight average molecular weight 20,000) with 100 parts of the reaction mixture before neutralization as synthesized in Production Example 17 and neutralizing the resulting mixture to pH 7 with an aqueous solution of sodium hydroxide.

The conversion (%) of each starting monomer and the results of analysis [the composition ratio of copolymer (% by mass), content of constituent unit derived from unsaturated polyalkylene glycol ether monomer (mole %), carboxylic acid content (meq/g) calculated on the unneutralized copolymer basis, weight average molecular weight, the content (%) of unsaturated polyalkylene glycol ether monomer relative to the neutralized copolymer, and the content (%) of polyalkylene glycol not containing an alkenyl group relative to the neutralized copolymer] of the copolymer contained in the admixture obtained in each of the above production examples are shown in Table 2.

kg/m$^3$ of coarse aggregate (crushed stone produced in Oume) was further added, followed by 90 seconds of mixing, whereby a concrete composition was obtained. For avoiding the possible influence of air bubbles in the concrete composition on the flowability of the concrete composition,

TABLE 2

| | Conversion (%) of each starting monomer AO monomer/AA/MA/other | Composition ratio of copolymer (%) AO monomer/AA/MA/other | AO monomer-derived constituent unit (mole %) | Carboxylic acid content (meq/g) calculated on the unneutralized basis | Weight average molecular weight | AO monomer content (%) * 1 | Polyalkylene glycol content (%) * 2 |
|---|---|---|---|---|---|---|---|
| Cement admixture(1) | 94.5/98.0/0.0/0.0 | 91.9/8.1/0.0/0.0 | 26.3 | 1.13 | 28500 | 5.2 | 6.4 |
| Cement admixture(2) | 89.5/97.0/0.0/0.0 | 94.1/5.9/0.0/0.0 | 20.4 | 0.82 | 36000 | 10.9 | 9.7 |
| Cement admixture(3) | 69.8/94.5/0.0/0.0 | 89.7/10.3/0.0/0.0 | 20.3 | 1.43 | 23700 | 37.6 | 9.0 |
| Cement admixture(4) | 92.3/98.5/0.0/HEA 98.0 | 89.0/8.3/0.0/HEA 2.7 | 21.9 | 1.15 | 27000 | 7.2 | 6.3 |
| Cement admixture(5) | 88.5/0.0/87.0/0.0 | 90.8/0.0/9.2/0.0 | 33.3 | 1.59 | 26300 | 11.4 | 6.6 |
| Cement admixture(6) | 79.2/0.0/75.4/0.0 | 95.1/0.0/4.9/0.0 | 33.2 | 0.85 | 33500 | 24.5 | 11.1 |
| Cement admixture(7) | 90.0/98.0/91.5/0.0 | 88.1/4.3/7.6/0.0 | 23.4 | 1.92 | 29000 | 9.4 | 6.3 |
| Cement admixture(8) | 8.95/0.0/90.0/HEA 97.4 | 87.8/0.0/9.4/HEA 2.8 | 26.7 | 1.62 | 28600 | 9.9 | 6.3 |
| Cement admixture(9) | 88.0/98.0/0.0/0.0 | 93.5/6.5/0.0/0.0 | 31.3 | 0.90 | 29500 | 12.5 | 7.0 |
| Cement admixture(10) | 93.5/98.5/0.0/PGA25 99.0 | 85.9/6.1/0.0/PGA25 8.0 | 29.0 | 0.85 | 34000 | 5.9 | 6.0 |
| Cement admixture(11) | 88.4/98.2/0.0/0.0 | 93.5/6.5/0.0/0.0 | 31.3 | 0.90 | 30000 | 12.0 | 7.0 |
| Cement admixture(12) | 89.0/0.0/91.0/PGA25 97.0 | 86.8/0.0/7.6/PGA25 5.6 | 25.1 | 1.31 | 32500 | 10.4 | 7.3 |
| Comparative cement admixture(1) | 98.8/99.8/0.0/0.0 | 61.2/38.8/0.0/0.0 | 17.8 | 5.38 | 38500 | 0.7 | 0.0 |
| Comparative cement admixture(2) | 41.0/0.0/53.5/0.0 | 90.5/0.0/9.5/0.0 | 32.6 | 1.64 | 9800 | 125.7 | 0.0 |
| Comparative cement admixture(3) | 41.0/0.0/53.5/0.0 | 90.5/0.0/9.5/0.0 | 32.6 | 1.64 | 9800 | 125.7 | 70.0 |

In Table 2, the following abbreviations are used.
AO monomer: Unsaturated polyalkylene glycol ether monomer
MA: Maleic acid
AA: Acrylic acid
HEA: 2-Hydroxyethyl acrylate
PGA25: Methoxypolyethylene glycol monoacrylate, in which the mean addition number of moles of the ethylene oxide being 25
Both the contents *1 and *2 are relative to the neutralized copolymer.

<Concrete Test A>

Concrete compositions were prepared using the above cement admixtures (1) to (12) of the present invention and the above comparative cement admixtures (1) to (3), which were obtained in the above Production Examples. These concrete compositions were measured for change in slump flow value with time, rate of spreading and air content by the methods described under 1) to 3) below. The results are shown in Table 3.

Concrete composition preparation was carried out as follows. First, 658 kg/m$^3$ of fine aggregate (Oi river system land sand) was dry-mixed in a 50-L forced mixing pan type mixer for 10 seconds, 580 kg/m$^3$ of cement (ordinary portland cement, product of Taiheiyo Cement) was then added, followed by 10 seconds of mixing. Then, 174 kg/m$^3$ of tap water with the cement admixture added in an amount to give an initial slump flow value of 600±50 mm was added, and mixing was conducted for 150 seconds. Then, 895 a commercial oxyalkylene type antifoaming agent (trademark: SURFYNOL 440, product of Nissin Chemical Industry, corresponding to an acetylene ether produced by addition polymerization of an alkylene oxide onto an acetylene alcohol) was used to adjust the air content to 2.0±0.5% by volume in Examples 1 to 10, 12 and Comparative Examples 1 to 3. On the other hand, in Example 11, wherein the cement admixture (11) was used, the concrete composition was mixed not using the above oxyalkylene type antifoaming agent. The water/cement ratio (by mass) was 0.30, and the fine aggregate ratio [fine aggregate/(fine aggregate+coarse aggregate)] (by volume) was 0.424. The amount of the cement admixture relative to cement (amount of the solid matter component [nonvolatile component] in the cement admixture relative to cement) (% by mass) and the amount of the copolymer in the cement admixture relative to cement (% by mass) were as shown in Table 3. The solid matter component [nonvolatile component] in the cement admixture was determined by drying an appropriate amount of the cement admixture by heating at 130° C. to thereby remove the volatile matter, and an amount of the admixture was weighed and used so that a predetermined amount of the solid matter component [nonvolatile component] might be contained in compounding with cement.

1) Change in slump flow value with time: The method of JIS-A-1101 was followed.
2) Rate of spreading (test for evaluating the effect of reducing the viscosity of a concrete composition): On the occasion of measuring the initial slump flow value, the time required for the flow value to reach 500 mm following pulling up the slump cone was measured, and this time was reported as the rate of spreading (seconds). When this time is shorter, the viscosity reducing effect under high shear conditions is better.
3) Air content: The method of JIS-A-1128 was followed.

which the cement admixtures of the present invention were used, the change in slump flow value with time was small and the rate of spreading was rapid. Thus, it is evident that the time-dependent decrease in flowability of each concrete composition is slight and a good viscosity reducing effect can be produced under high shear conditions. Further, in Example 11, in which the cement admixture (11) prepared by polymerizing the copolymer under the presence of the oxyalkylene type antifoaming agent was used, it is seen that the concrete composition which containing predetermined amount of air was obtained without adding the antifoaming agent in concrete mixing.

<Polycarboxylic Acid Type Cement Dispersant (PC)>

As a polycarboxylic acid type cement dispersant (PC) containing a (poly)oxyalkylene group(s) and carboxyl groups in the molecule, copolymers described below were used.

Copolymer (PC1-1): A copolymer of methoxypolyethylene glycol monomethacrylate (i) and sodium methacrylate

TABLE 3

| | Admixture | Amount of admixture/ cement(%) | Amount of copolymer/ cement(%) | Amount of AO monomer/ cement(%) | Amount of polyalkylene glycol/ cement(%) | Slump flow value (mm) | | | Rate of spreading (sec) | Air content (% by volume) |
|---|---|---|---|---|---|---|---|---|---|---|
| | | | | | | After 5 min | After 60 min | After 90 min | | |
| Example 1 | Cement admixture(1) | 0.220 | 0.1972 | 0.0103 | 0.0125 | 630 | 520 | 397 | 9.8 | 2.1 |
| Example 2 | Cement admixture(2) | 0.220 | 0.1825 | 0.0198 | 0.0177 | 620 | 515 | 400 | 9.3 | 1.8 |
| Example 3 | Cement admixture(3) | 0.280 | 0.1910 | 0.0718 | 0.0171 | 615 | 545 | 460 | 8.3 | 2.3 |
| Example 4 | Cement admixture(4) | 0.220 | 0.1938 | 0.0140 | 0.0122 | 590 | 528 | 435 | 9.0 | 1.9 |
| Example 5 | Cement admixture(5) | 0.240 | 0.2033 | 0.0232 | 0.0135 | 580 | 510 | 395 | 10.7 | 2.0 |
| Example 6 | Cement admixture(6) | 0.260 | 0.1918 | 0.0470 | 0.0212 | 617 | 550 | 418 | 11.2 | 1.9 |
| Example 7 | Cement admixture(7) | 0.230 | 0.1988 | 0.0187 | 0.0125 | 625 | 545 | 403 | 10.2 | 1.8 |
| Example 8 | Cement admixture(8) | 0.240 | 0.2064 | 0.0205 | 0.0131 | 610 | 555 | 445 | 10.5 | 2.2 |
| Example 9 | Cement admixture(9) | 0.240 | 0.2009 | 0.0251 | 0.0140 | 605 | 515 | 405 | 10.0 | 1.9 |
| Example 10 | Cement admixture(10) | 0.230 | 0.2055 | 0.0120 | 0.0124 | 610 | 560 | 490 | 9.6 | 2.1 |
| Example 11 | Cement admixture(11) | 0.240 | 0.2000 | 0.0241 | 0.0159 | 600 | 505 | 400 | 9.8 | 2.3 |
| Example 12 | Cement admixture(12) | 0.260 | 0.2226 | 0.0232 | 0.0141 | 590 | 540 | 465 | 10.8 | 2.2 |
| Comparative Example 1 | Comparative cement admixture(1) | 0.230 | 0.2285 | 0.0015 | 0.0000 | 605 | 213 | 200 | 22.0 | 2.1 |
| Comparative Example 2 | Comparative cement admixture(2) | 0.530 | 0.2348 | 0.2952 | 0.0000 | 630 | 480 | 300 | 14.5 | 2.3 |
| Comparative Example 3 | Comparative cement admixture(3) | 0.700 | 0.2367 | 0.2975 | 0.1657 | 615 | 490 | 320 | 13.8 | 1.7 |

In Table 3, the amount of admixture/cement (%) is the amount (% by mass) of the solid matter component (nonvolatile component) in the cement admixture relative to cement.

From Table 3, it is seen that when the comparative cement admixture (1) was used, the change in slump flow value with time was significantly great and the rate of spreading was very slow. On the other hand, when the comparative cement admixture (2) or (3) was used, a higher addition level was required to obtained the desired slump flow value and that the change in slump flow value with time was great and the rate of spreading was slow. On the contrary, in all cases in (ii), mass ratio (i)/(ii) of 75/25, and the mean addition number of moles of ethylene oxide in above (i) was 6; the weight average molecular weight of the copolymer was 12,000; and the number of milliequivalents (meq/g) of carboxyl group in each gram of the copolymer was 2.44 meq/g as determined on the unneutralized basis.

Copolymer (PC1-2): A copolymer of methoxypolyethylene glycol monomethacrylate (i) and sodium methacrylate (ii), mass ratio (i)/(ii) of 95/5, and the mean addition number of moles of ethylene oxide in above (i) was 100; the weight average molecular weight of the copolymer was 53,000; and the number of milliequivalents (meq/g) of carboxyl group in each gram of the copolymer was 0.47 meq/g as determined on the unneutralized basis.

Copolymer (PC2-1): A copolymer of methoxypolyethylene glycol monoallyl ether (i) and disodium maleate (ii), mass ratio (i)/(ii) of 90/10, and the mean addition number of moles of ethylene oxide in above (i) was 40; the weight average molecular weight of the copolymer was 18,000; and the number of milliequivalents (meq/g) of carboxyl group in each gram of the copolymer was 1.29 meq/g as determined on the unneutralized basis.

Copolymer (PC2-2): A copolymer of polyethylene glycol monomethallyl ether (i) and sodium acrylate (ii), mass ratio (i)/(ii) of 95/5, and the mean addition number of moles of ethylene oxide in above (i) was 100; the weight average molecular weight of the copolymer was 48,000; and the number of milliequivalents (meq/g) of carboxyl group in each gram of the copolymer was 0.54 meq/g as determined on the unneutralized basis.

<Concrete Test A>

Concrete compositions were prepared using the above cement admixtures (5) and (9) of the present invention, which were obtained in the above Production Examples, and the above polycarboxylic acid type cement dispersant (PC). Each of cement composition was subjected to the concrete test. The conditions of preparation and test of the concrete composition are same described in above concrete test A. In each composition, the commercial oxyalkylene type antifoaming agent (trademark: SURFYNOL 440, product of Nissin Chemical Industry, corresponding to an acetylene ether produced by addition polymerization of an alkylene oxide onto an acetylene alcohol) was used to adjust the air content to 2.0±05% by volume. The results of the tests, and the levels of addition of each cement admixture and polycarboxylic acid type dispersant (addition level of the copolymer) relative to cement are shown in Table 4.

Examples 5 and 9 where the cement admixture (5) or (9) of the present invention was used singly, the change in the slump value by time was smaller, and satisfactory levels of the initial dispersing ability and of the slump loss preventing effect were simultaneously attained at low addition levels even in the high water reduction ratio range, such as water/cement ratio (ratio by mass) was 0.30.

<Sulfonic Acid Type Dispersant (S)>

As a sulfonic acid type dispersant (S) containing a sulfonic acid group in the molecule, commercial items described below were used.

(S-1) Naphthalenesulfonic acid-formaldehyde condensates: Mighty 150 (product of Kao Corp.)
(S-2) Ligninsulfonate: Pozzolith No. 8 (product of Pozzolith Bussan Corp.)

<Concrete Test B>

Concrete compositions were prepared using the cement admixtures (5) and (9) according to the present invention, and the above sulfonic acid type dispersant (S). These cement admixture (5) or (9) according to the present invention, and the above sulfonic acid type dispersant (S) were used alone or in combination in the preparation of each concrete composition. Each of concrete composition was subjected to concrete test. Two species of concrete compositions, composed of below-mentioned Formulation B-1 and Formulation B-2, were prepared by using 3 types, which differed Lot number (X, Y, and Z), of Ordinary portland cement produced by Taiheiyo Cement as cement; Oi River system land sand as a fine aggregate; crushed stone produced in Oume as a coarse aggregate; and tap water as mixing water. Further, in order temperature of the concrete composition to test temperature, 20° C., the temperature of raw materials, the forced mixing pan type mixer and the measurement equipments used for the test was controlled under test temperature atmosphere, and mixing and each

TABLE 4

| | | Admixture | | Polycarboxylic acid type dispersant (PC) | | Combination ratio (%) | | Slump flow value (mm) | | | Rate of spreading (sec) | Air content (% by volume) |
|---|---|---|---|---|---|---|---|---|---|---|---|---|
| | Species | Amount of admixture/ cement (%) | Amount of copolymer (A)/ cement (%) | Species | Amount of dispersant/ cement(%) | Copolymer (A) | Polycarboxylic acid type disperant | After 5 min | After 60 min | After 90 min | | |
| Example13 | Cement admixture(5) | 0.180 | 0.153 | PC1-1 | 0.060 | 71.8 | 28.2 | 615 | 570 | 515 | 10.2 | 2.1 |
| Example14 | Cement admixture(5) | 0.180 | 0.153 | PC1-2 | 0.060 | 71.8 | 28.2 | 610 | 560 | 503 | 11.3 | 2.3 |
| Example15 | Cement admixture(5) | 0.180 | 0.153 | PC2-1 | 0.060 | 71.8 | 28.2 | 580 | 530 | 453 | 11.0 | 1.8 |
| Example16 | Cement admixture(5) | 0.180 | 0.153 | PC2-2 | 0.060 | 71.8 | 28.2 | 600 | 545 | 478 | 10.9 | 1.9 |
| Example17 | Cement admixture(9) | 0.180 | 0.151 | PC1-1 | 0.060 | 71.5 | 28.5 | 620 | 580 | 525 | 9.5 | 2.2 |
| Example18 | Cement admixture(9) | 0.180 | 0.151 | PC1-2 | 0.060 | 71.5 | 28.5 | 615 | 570 | 510 | 10.7 | 2.0 |
| Example19 | Cement admixture(9) | 0.180 | 0.151 | PC2-1 | 0.060 | 71.5 | 28.5 | 608 | 545 | 460 | 10.5 | 1.9 |
| Example20 | Cement admixture(9) | 0.180 | 0.151 | PC2-2 | 0.060 | 71.5 | 28.5 | 610 | 555 | 480 | 10.1 | 1.7 |

As can be seen from Table 4, in all of Examples 13 to 20 where the cement admixture (5) or (9) of the present invention, and above polycarboxylic acid type cement dispersant (PC) were used in combination, as compared with measurement were performed under above-mentioned test temperature atmosphere. Further, for avoiding the possible influence of bubbles in the concrete composition on the flowability of the concrete composition, when necessary, the air content was adjusted to 1.0±0.3% using a commercial oxyalkylene type antifoaming agent (trademark: SURFYNOL 440, product of Nissin Chemical Industry, corresponding to an acetylene ether produced by addition polymerization of an alkylene oxide onto an acetylene alcohol).

(Formulation B-1) The cement: 320 kg/m$^3$, water: 176 kg/m$^3$, the fine aggregate: 822 kg/m$^3$, the coarse aggregate: 892 kg/m$^3$, the proportion of the fine aggregate (the fine aggregate/(the fine aggregate+the coarse aggregate)) (by volume): 48%, the ratio of water/cement (by mass)= 0.55

(Formulation B-2) The cement: 473 kg/m$^3$, water: 189 kg/m$^3$, the fine aggregate: 722 kg/m$^3$, the coarse aggregate: 884 kg/m$^3$, the proportion of the fine aggregate (the fine aggregate/(the fine aggregate+the coarse aggregate)) (by volume): 45%, the ratio of water/cement (by mass)= 0.40

The concrete was produced by 2 minutes mixing using the forced mixing pan type mixer under above-mentioned condition, and the slump value, the flow value, and the air content of the concrete were measured. The measurements of the slump value, the flow value, and the air content were performed following to Japanese Industrial Standards (JIS-A-1101 and 1128). When the comparison dispersing test with the cements of 3 types which differed Lot number (X, Y, and Z) was performed, in Formulation B-1, it compared at the addition level of the cement admixture where the slump value became 18.0 to 19.0 cm when cement X was used, and in Formulation B-2, it compared the addition level of the cement admixture where the flow value became 600 to 650 mm when cement X was used. The solid matter component [nonvolatile component] in each aqueous solution of the cement admixture obtained by above-mentioned Production Examples and aqueous solution of above-mentioned sulfonic acid type dispersants was measured by weighing an appropriate amount of each solution, and drying by heating at 130° C. to remove the volatile matter, and an amount of the aqueous cement admixture solution was weighed and incorporated in cement so that a predetermined amount of the solid matter component [nonvolatile component] might be contained in the formulation. The results of the test and the addition level of the cement admixture relative to the cement are shown in Table 5 and Table 6.

In Table 5 and 6, "copolymer (A) (solid matter component)" corresponds to the amount of solid matter component [nonvolatile component] in each aqueous solution of the cement admixture which includes the copolymer, namely, the amount of solid matter which includes the nonvolatile component not only the copolymer but also other than the copolymer, e.g. the nonvolatile unreacted monomer and the non-polymerizable polyalkylene glycol not containing an alkenyl group.

"Copolymer (A) (net amount)" corresponds to the amount of solid matter component [nonvolatile component] only of the copolymer, "total" means the total of above "copolymer (A) (solid matter component)", and the amount of solid matter component in the aqueous solution of the sulfonic acid type dispersant.

TABLE 5

| | Formulation of concrete | Formulation | Addition level of solid matter component(mass %)/cement | | | Addition level of copolymer (A) (net amount) | Combination ratio (%) | | Slump value (cm) | | |
| --- | --- | --- | --- | --- | --- | --- | --- | --- | --- | --- | --- |
| | | | Copolymer (A) (Solid matter component) | Sulfonic acid type dispersant | Total | (mass %)/ cement | Copolymer (A) (net amount) | Sulfonic acid type dispersant | Cement X | Cement Y | Cement Z |
| Example21 | B-1 | Cement admixture(5) + S-1 | 0.11 | 0.08 | 0.19 | 0.092 | 53.5 | 46.5 | 18.3 | 17.7 | 19.0 |
| Example22 | B-1 | Cement admixture(9) + S-1 | 0.10 | 0.08 | 0.18 | 0.085 | 51.4 | 48.6 | 18.5 | 17.7 | 19.3 |
| Example23 | B-1 | Cement admixture(5) + S-2 | 0.11 | 0.10 | 0.21 | 0.092 | 47.9 | 52.1 | 18.5 | 17.9 | 19.1 |
| Example24 | B-1 | Cement admixture(9) + S-2 | 0.10 | 0.10 | 0.20 | 0.085 | 45.9 | 54.1 | 18.7 | 18.0 | 19.5 |
| Comparative Example4 | B-1 | Admixture(5) | 0.14 | — | 0.14 | 0.117 | 100.0 | 0.0 | 18.1 | 16.6 | 19.8 |
| Comparative Example5 | B-1 | Admixture(9) | 0.13 | — | 0.13 | 0.110 | 100.0 | 0.0 | 18.8 | 17.0 | 20.7 |
| Comparative Example6 | B-1 | S-1 | — | 0.30 | 0.30 | — | 0.0 | 100.0 | 18.3 | 18.1 | 18.5 |
| Comparative Example7 | B-1 | S-2 | — | 0.35 | 0.35 | — | 0.0 | 100.0 | 18.3 | 18.0 | 18.5 |

TABLE 6

| | Formulation of concrete | Formulation | Addition level of solid matter component(mass %)/cement | | | Addition level of copolymer (A) (net amount) (mass %)/ cement | Combination ratio (%) | | Flow value (mm) | | |
|---|---|---|---|---|---|---|---|---|---|---|---|
| | | | Copolymer (A) (Solid matter component) | Sulfonic acid type dispersant | Total | | Copolymer (A) (net amount) | Sulfonic acid type dispersant | Cement X | Cement Y | Cement Z |
| Example25 | B-2 | Cement admixture(5) + S-1 | 0.14 | 0.20 | 0.34 | 0.117 | 36.9 | 63.1 | 618 | 583 | 656 |
| Example26 | B-2 | Cement admixture(9) + S-1 | 0.13 | 0.20 | 0.33 | 0.110 | 35.5 | 64.5 | 627 | 588 | 664 |
| Example27 | B-2 | Cement admixture(5) + S-2 | 0.14 | 0.30 | 0.44 | 0.117 | 28.1 | 71.9 | 602 | 568 | 635 |
| Example28 | B-2 | Cement admixture(9) + S-2 | 0.13 | 0.30 | 0.43 | 0.110 | 26.9 | 73.1 | 614 | 577 | 656 |
| Comparative Example8 | B-2 | Admixture(5) | 0.18 | — | 0.18 | 0.151 | 100.0 | 0.0 | 619 | 522 | 717 |
| Comparative Example9 | B-2 | Admixture(9) | 0.16 | — | 0.16 | 0.136 | 100.0 | 0.0 | 630 | 563 | 728 |
| Comparative Example10 | B-2 | S-1 | — | 0.70 | 0.70 | — | 0.0 | 100.0 | 605 | 593 | 618 |
| Comparative Example11 | B-2 | S-2 | — | 1.00 | 1.00 | — | 0.0 | 100.0 | 415 | 410 | 422 |

As can be seen from Table 5 and Table 6, for cement admixtures (5) or (9) of the present invention, when each was used alone, either the variance of the dispersability caused by cement Lot No. was large although the addition level was low. On the other hand, for the dispersants (S-1) or (S-2) correspond to the sulfonic acid type dispersant (S) containing a sulfonic acid group in the molecule, when each was used alone, although the variance of dispersing ability caused by cement Lot No. was small, when water/cement ratio became low, the addition level necessary for dispersion suddenly increased. However, all of Examples 21 to 28 where above cement admixtures according to the present invention and the sulfonic acid type dispersant were used in combination, satisfactory levels of dispersing ability were attained at low addition levels, and the variance of dispersing ability caused by cement Lot No. was small, in addition, the stabilized dispersing ability was able to be obtained.

<Other Additive>

Further, following additives were used as other additive.

Retarder: sodium gluconate

AE agent: Vinsol W (trademark, resin soap type, product of Yamaso Chemical)

Antiforming agent-1: an oxyalkylene type antiforming agent, SURFYNOL 440 (trademark, an acetylene ether produced by addition polymerization of an alkylene oxide onto an acetylene alcohol, product of Nissin Chemical Industry) Antiforming agent-2: an oxyalkylene type antiforming agent, a higher (containing 12 to 14 carbon atoms) alcohol-oxyethyleneoxypropylene adduct, in which the mean addition number of moles of ethylene oxide was 9, and of propylene oxide was 5.

Antiforming agent-3: an oxyalkylene type antiforming agent, laurylamine-oxyethyleneoxypropylene adduct, in which the mean addition number of moles of ethylene oxide was 4, and of propylene oxide was 8.

<Concrete Test B>

Concrete compositions were prepared using the cement admixtures (5) and (9) according to the present invention obtained by the above Production Examples, above ligninsulfonate (S-2), and the above other additives. Each of concrete composition was subjected to the concrete test. The conditions of preparation and test of the concrete composition are same described in above concrete test B. The above Ordinary portland cement produced by Taiheiyo Cement (Lot number: X) was used as cement. The results of the test and level of addition of each additive were shown in Table 7 and Table 8. In the Tables, the amount of cement admixture, ligninsulfonate (S-2), retarder or AE agent refers to the level of addition of each solid matter component relative to cement. The amount of antiforming agent refers to the level of addition of each antiforming agent relative to the amount of solid matter component in the cement additive (% by mass).

TABLE 7

| | Formulation of concrete | Admixture Species | Amount of admixture/ cement (%) | Amount of copolymer (A)/ cement (%) | Amount of Lignin sulfonate/ cement | Amount of retarder/ cement (%) | Combination ratio (%) Copolymer (A) | Lignin sulfonate | Retarder |
|---|---|---|---|---|---|---|---|---|---|
| Example29 | B-1 | Cement admixture(5) | 0.120 | 0.100 | 0.050 | 0.080 | 43.6 | 21.7 | 34.7 |
| Example30 | B-1 | Cement admixture(5) | 0.120 | 0.100 | 0.050 | 0.080 | 43.6 | 21.7 | 34.7 |
| Example31 | B-1 | Cement admixture(5) | 0.120 | 0.100 | 0.050 | 0.080 | 43.6 | 21.7 | 34.7 |
| Example32 | B-1 | Cement admixture(9) | 0.110 | 0.093 | 0.050 | 0.080 | 41.8 | 22.4 | 35.8 |
| Example33 | B-1 | Cement admixture(9) | 0.110 | 0.093 | 0.050 | 0.080 | 41.8 | 22.4 | 35.8 |
| Example34 | B-1 | Cement admixture(9) | 0.110 | 0.093 | 0.050 | 0.080 | 41.8 | 22.4 | 35.8 |

| | Amount of AE agent/ cement (%) | Antiforming agent Species | Amount of Antiforming agent/ cement admixture (%) | Slump value (cm) (After 5 min) | Air content (% by volume) |
|---|---|---|---|---|---|
| Example29 | 0.03 | Antiforming agent-1 | 1.0 | 18.0 | 5.0 |
| Example30 | 0.03 | Antiforming agent-2 | 6.0 | 18.6 | 5.8 |
| Example31 | 0.03 | Antiforming agent-3 | 4.0 | 18.3 | 5.2 |
| Example32 | 0.03 | Antiforming agent-1 | 0.5 | 18.5 | 5.1 |
| Example33 | 0.03 | Antiforming agent-2 | 6.0 | 18.9 | 5.9 |
| Example34 | 0.03 | Antiforming agent-3 | 4.0 | 18.7 | 5.3 |

TABLE 8

| | Formulation of concrete | Admixture Species | Amount of admixture/ cement (%) | Amount of copolymer (A)/ cement (%) | Amount of Lignin sulfonate/ cement | Amount of retarder/ cement (%) | Combination ratio (%) Copolymer (A) | Lignin sulfonate | Retarder |
|---|---|---|---|---|---|---|---|---|---|
| Example35 | B-2 | Cement admixture(5) | 0.150 | 0.126 | 0.200 | 0.120 | 28.2 | 44.9 | 26.9 |
| Example36 | B-2 | Cement admixture(5) | 0.150 | 0.126 | 0.200 | 0.120 | 28.2 | 44.9 | 26.9 |
| Example37 | B-2 | Cement admixture(5) | 0.150 | 0.126 | 0.200 | 0.120 | 28.2 | 44.9 | 26.9 |
| Example38 | B-2 | Cement admixture(9) | 0.140 | 0.119 | 0.200 | 0.120 | 27.0 | 45.6 | 27.4 |
| Example39 | B-2 | Cement admixture(9) | 0.140 | 0.119 | 0.200 | 0.120 | 27.0 | 45.6 | 27.4 |
| Example40 | B-2 | Cement admixture(9) | 0.140 | 0.119 | 0.200 | 0.120 | 27.0 | 45.6 | 27.4 |

TABLE 8-continued

|  | Amount of AE agent/ cement (%) | Antiforming agent | | Slump value (cm) (After 5 min) | Air content (% by volume) |
|---|---|---|---|---|---|
|  |  | Species | Amount of Antiforming agent/ cement admixture (%) | | |
| Example35 | 0.03 | Antiforming agent-1 | 0.8 | 605 | 5.1 |
| Example36 | 0.03 | Antiforming agent-2 | 5.0 | 628 | 5.7 |
| Example37 | 0.03 | Antiforming agent-3 | 3.0 | 613 | 5.4 |
| Example38 | 0.03 | Antiforming agent-1 | 0.5 | 625 | 5.0 |
| Example39 | 0.03 | Antiforming agent-2 | 5.0 | 637 | 5.6 |
| Example40 | 0.03 | Antiforming agent-3 | 3.0 | 630 | 5.5 |

As can be seen from Table 7 and Table 8, for the concrete compositions prepared by adding the above ligninsulfonate (S-2), and the above other additives to the cement admixture (5) or (9) according to the present invention, sufficient dispersing ability was obtained and, in addition, the air content thereof can be controlled within the range of 5 to 6%, which is the required air content range to obtain freeze-thaw-resistance.

What is claimed is:

1. A cement admixture comprising, as three essential constituents, 1) a copolymer (A),
2) an unsaturated (poly)alkylene glycol ether monomer (a), and
3) an unpolymerizable (poly)alkylene glycol (B) not containing an alkenyl group, wherein the content of the unsaturated (poly)alkylene glycol ether monomer (a) is 1 to 100% by mass relative to the copolymer (A) and the content of the unpolymerizable (poly)alkylene glycol (B) not containing an alkenyl group is 1 to 50% by mass relative to the copolymer (A), and wherein the copolymer (A) comprises, as essential constituent units, a constituent unit (I) derived from the unsaturated (poly)alkylene glycol ether monomer (a), and a constituent unit (II) derived from an unsaturated carboxylic acid monomer (b), with the constituent unit (I) and constituent unit (II) each accounting for not less than 1% by mass based on all of the constituent units, the unsaturated (poly)alkylene glycol ether monomer (a) is represented by the general formula (1):

$$YO(R^1O)_nR^2 \quad (1)$$

wherein Y represents an alkenyl group containing 5 to 8 carbon atoms, the n $R^1O$ groups may be the same or different and each represents an oxyalkylene group containing 2 to 18 carbon atoms, $R^2$ represents a hydrogen atom or a hydrocarbon group containing 1 to 30 carbon atoms, and n is the mean addition number of moles of the oxyalkylene group and represents a number of 1 to 500, and the unsaturated carboxylic acid monomer (b) being an unsaturated monocarboxylic acid monomer.

2. A cement admixture comprising, as three essential constituents, 1) a copolymer (A),
2) an unsaturated (poly)alkylene glycol ether monomer (a) and
3) an unpolymerizable (poly)alkylene glycol (B) not containing an alkenyl group, wherein the content of the unsaturated (poly)alkylene glycol ether monomer (a) is 1 to 50% by mass relative to the copolymer (A) and the content of the unpolymerizable (poly)alkylene glycol (B) not containing an alkenyl group is 6 to 50% by mass relative to the copolymer (A), and wherein the copolymer (A) comprises, as essential constituent units, a constituent unit (I) derived from the unsaturated (poly)alkylene glycol ether monomer (a), and a constituent unit (II) derived from an unsaturated carboxylic acid monomer (b), with the constituent unit (I) and constituent unit (II) each accounting for not less than 1% by mass based on all of the constituent units, and the unsaturated (poly)alkylene glycol ether monomer (a) is represented by the general formula (1):

$$YO(R^1O)_nR^2 \quad (1)$$

wherein Y represents an alkenyl group containing 5 to 8 carbon atoms, the n $R^1O$ groups may be the same or different and each represents an oxyalkylene group containing 2 to 18 carbon atoms, $R^2$ represents a hydrogen atom or a hydrocarbon group containing 1 to 30 carbon atoms, and n is the mean addition number of moles of the oxyalkylene group and represents a number of 1 to 500.

3. The cement admixture according to claim 1, wherein the unsaturated carboxylic acid monomer (b) is unsaturated monocarboxylic acid monomer represented by the general formula (2):

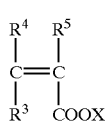

$$\begin{array}{cc} R^4 & R^5 \\ | & | \\ C=C \\ | & | \\ R^3 & COOX \end{array} \quad (2)$$

wherein $R^3$, $R^4$ and $R^5$ are the same or different and each represents a hydrogen atom or a methyl group; the X groups may be the same or different and each represents a hydrogen atom, a univalent metal atom, a bivalent metal atom, an ammonium group or an organic amine group.

4. The cement admixture according to claim 2, wherein the unsaturated carboxylic acid monomer (b) is represented by the general formula (2):

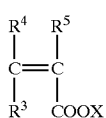

(2)

wherein $R^3$, $R^4$ and $R^5$ are the same or different and each represents a hydrogen atom, a methyl group or a group of the formula —(CH2)pCOOX, and, when the unsaturated carboxylic acid monomer (b) is an unsaturated monocarboxylic acid monomer, $R^3$, $R^4$ and $R^5$ are the same or different and each represents a hydrogen atom or a methyl group; the X groups may be the same or different and each represents a hydrogen atom, a univalent metal atom, a bivalent metal atom, an ammonium group or an organic amine group; p represents an integer of 0 to 2; and, when there are two COOX groups, the two —COOX groups may form a —COOCO— group.

5. The cement admixture according to claim 1, wherein the copolymer (A) further has a constituent unit (III) derived from a (poly) alkylene glycol mono (meth) acrylic acid ester monomer (c) represented by the general formula (3):

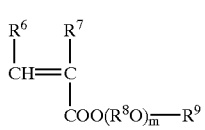

(3)

wherein $R^6$ and $R^7$ are the same or different and each represents a hydrogen atom or a methyl group, the m $R^8O$ groups may be the same or different and each represents an oxyalkylene group containing 2 to 18 carbon atoms, m is the mean addition number of moles of the oxyalkylene group and represents a number of 1 to 500, $R^9$ represents a hydrogen atom or a hydrocarbon group containing 1 to 30 carbon atoms and the constituent unit (III) accounts for not less than 1% by mass based on all the constituent units.

6. The cement admixture according to claim 2, wherein the copolymer (A) further has a constituent unit (III) derived from a (poly) alkylene glycol mono (meth) acrylic acid ester monomer (c) represented by the general formula (3):

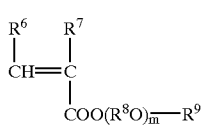

(3)

wherein $R^6$ and $R^7$ are the same or different and each represents a hydrogen atom or a methyl group, the m $R^8O$ groups may be the same or different and each represents an oxyalkylene group containing 2 to 18 carbon atoms, m is the mean addition number of moles of the oxyalkylene group and represents a number of 1 to 500, $R^9$ represents a hydrogen atom or a hydrocarbon group containing 1 to 30 carbon atoms, and the constituent unit (III) accounts for not less than 1% by mass based on all the constituent units.

7. The cement admixture according to claim 1, wherein, in the general formula (1), Y is a group represented by the general formula (4):

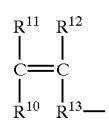

(4)

wherein $R^{10}$, $R^{11}$ and $R^{12}$ are the same or different and each represents a hydrogen atom or a methyl group, $R^{13}$ is bonded to —O—$(R^1O)nR^2$ in the above general formula (1) and represents —$CH_2$—, —$(CH_2)_2$— or —$C(CH_3)_2$—; and the total number of carbon atoms in $R^{10}$, $R^{11}$, $R^{12}$ and $R^{13}$ is 3.

8. The cement admixture according to claim 2, wherein, in the general formula (1), Y is a group represented by the general formula (4):

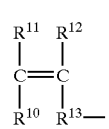

(4)

wherein $R^{10}$, $R^{11}$ and $R^{12}$ are the same or different and each represents a hydrogen atom or a methyl group, $R^{13}$ is bonded to —O—$(R^1O)nR^2$ in the above general formula (1) and represents —$CH_2$—, —$(CH_2)_2$— or —$C(CH_3)_2$—; and the total number of carbon atoms in $R^{10}$, $R^{11}$, $R^{12}$ and $R^{13}$ is 3.

9. A cement composition which comprises the cement admixture according to claim 1, cement, and water as essential constituents.

10. A cement composition which comprises the cement admixture according to claim 2, cement, and water as essential constituents.

11. The cement admixture according to claim 1, wherein the unpolymerizable (poly)alkylene glycol (B) not containing an alkenyl group is water-soluble and contains oxyethylene groups in a proportion of not less than 50 mole % relative to the oxyalkylene groups in the unpolymerizable (poly) alkylene glycol (B) not containing an alkenyl group.

12. The cement admixture according to claim 2, wherein the unpolymerizable (poly)alkylene glycol (B) not containing an alkenyl group is water-soluble and contains oxyethylene groups in a proportion of not less than 50 mole % relative to the oxyalkylene groups in the unpolymerizable (poly) alkylene glycol (B) not containing an alkenyl group.

* * * * *